United States Patent
Hay

(10) Patent No.: US 9,512,708 B2
(45) Date of Patent: Dec. 6, 2016

(54) SYSTEM AND METHOD FOR AUTOMATIC WEIGHT-ON-BIT SENSOR CALIBRATION

(75) Inventor: Richard T. Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 362 days.

(21) Appl. No.: 13/518,769

(22) PCT Filed: Jun. 29, 2011

(86) PCT No.: PCT/US2011/042329
§ 371 (c)(1),
(2), (4) Date: Mar. 11, 2014

(87) PCT Pub. No.: WO2013/002782
PCT Pub. Date: Jan. 3, 2013

(65) Prior Publication Data
US 2014/0190747 A1    Jul. 10, 2014

(51) Int. Cl.
*E21B 47/00* (2012.01)
*E21B 44/00* (2006.01)
*E21B 47/024* (2006.01)
*E21B 41/00* (2006.01)
*G01G 23/01* (2006.01)

(52) U.S. Cl.
CPC .......... *E21B 47/00* (2013.01); *E21B 41/0092* (2013.01); *E21B 44/00* (2013.01); *E21B 47/0006* (2013.01); *E21B 47/024* (2013.01); *G01G 23/01* (2013.01)

(58) Field of Classification Search
CPC ...... E21B 47/006; E21B 47/024; E21B 47/00; E21B 44/00; E21B 41/0092; E21B 47/12; E21B 7/04; G01G 23/01
See application file for complete search history.

(56) References Cited

U.S. PATENT DOCUMENTS

| | | | |
|---|---|---|---|
| 5,141,060 A | 8/1992 | Jogi | |
| 6,152,246 A | 11/2000 | King et al. | |
| 6,192,998 B1 | 2/2001 | Pinckard | |
| 6,438,495 B1 | 8/2002 | Chau et al. | |
| 6,470,976 B2 | 10/2002 | Alft et al. | |
| 6,662,110 B1 * | 12/2003 | Bargach | E21B 44/00 175/45 |
| 6,820,702 B2 | 11/2004 | Niedermayr et al. | |
| 6,842,699 B2 | 1/2005 | Estes | |
| 7,100,708 B2 | 9/2006 | Koederitz | |

(Continued)

FOREIGN PATENT DOCUMENTS

| | | |
|---|---|---|
| EP | 0263644 A2 | 4/1988 |
| WO | 2010059295 A1 | 5/2010 |

OTHER PUBLICATIONS

Extended European Search Report dated Aug. 7, 2015, issued in corresponding application No. EP 11868584.1 6 pgs.

*Primary Examiner* — Yong-Suk (Philip) Ro
(74) *Attorney, Agent, or Firm* — Chamberlain Hrdlicka

(57) ABSTRACT

A system and method for automatic weight-on-bit sensor calibration automatically compensate the measurements of a weight-on-bit sensor based on one or more of mass, hole inclination, buoyancy, drag, and mud flow, resulting in a more accurate axial force measurement below the weight-on-bit sensor at various hole inclinations. This measurement is observed by removing some of the effects masking the actual force being applied to the axial face of the drill bit.

19 Claims, 18 Drawing Sheets

(56) References Cited

U.S. PATENT DOCUMENTS

| | | |
|---|---|---|
| 7,172,037 B2 | 2/2007 | Dashevskiy et al. |
| 7,243,735 B2 | 7/2007 | Koederitz et al. |
| 7,278,496 B2 | 10/2007 | Leuchtenberg |
| 7,316,277 B2 | 1/2008 | Jeffryes |
| 7,363,988 B2 | 4/2008 | Jeffryes |
| 7,367,411 B2 | 5/2008 | Leuchtenberg |
| 7,555,391 B2 | 6/2009 | Gleitman |
| 7,556,104 B2 | 7/2009 | Jeffryes |
| 7,650,950 B2 | 1/2010 | Leuchtenberg |
| 7,802,637 B2 | 9/2010 | Aronstam et al. |
| 2001/0041963 A1 | 11/2001 | Estes et al. |
| 2007/0185696 A1* | 8/2007 | Moran .................. E21B 44/00 703/10 |
| 2007/0284147 A1* | 12/2007 | Moran .................. E21B 44/00 175/24 |
| 2008/0156531 A1 | 7/2008 | Boone et al. |
| 2008/0253228 A1* | 10/2008 | Camwell .............. E21B 47/12 367/82 |
| 2009/0038392 A1 | 2/2009 | Alfred et al. |
| 2009/0078462 A1 | 3/2009 | Boone et al. |
| 2009/0126994 A1 | 5/2009 | Tibbitts et al. |
| 2009/0139767 A1 | 6/2009 | Jeffryes |
| 2009/0260876 A1 | 10/2009 | Gleitman |
| 2010/0025110 A1 | 2/2010 | John et al. |
| 2010/0108384 A1 | 5/2010 | Byreddy et al. |
| 2010/0139981 A1 | 6/2010 | Meister et al. |
| 2012/0272174 A1* | 10/2012 | Vogel .................. E21B 44/00 715/772 |
| 2012/0316787 A1* | 12/2012 | Moran .................. E21B 44/00 702/9 |

* cited by examiner

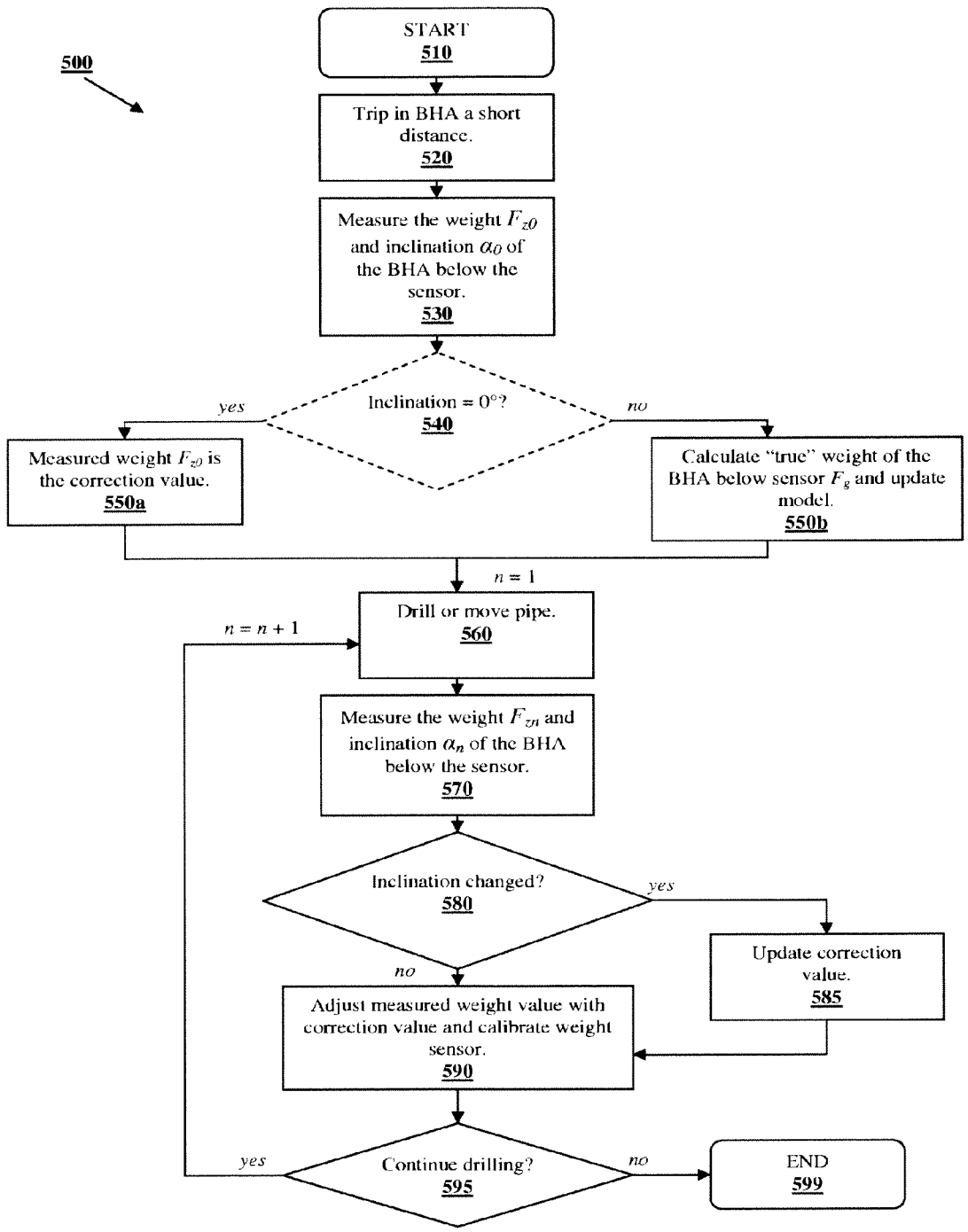

SYSTEM AND METHOD FOR AUTOMATIC WEIGHT-ON-BIT SENSOR CALIBRATION

FIELD OF THE INVENTION

The present disclosure relates generally to oilfield measurements, and more particularly, to systems and methods for automatic weight-on-bit sensor calibration.

BACKGROUND OF THE INVENTION

Boreholes are created by drilling into the earth using a rig. The rig drives a bottomhole assembly (BHA) on a drill string to create a hole. The BHA comprises a drill bit, which is provided with sufficient weight-on-bit (WOB) to break the rock. The BHA also may provide directional control of the drill bit and may use sensors to take down hole measurements of actual drilling conditions.

Fluid, or "mud," is pumped down hole through a drill pipe while drilling. The mud cools the drill bit, circulates through the borehole, and returns drill cuttings, such as sand and shale, to the surface. The cuttings are passed through a shaker which strains the cuttings from the mud, and through a centrifuge which separates the sand from the mud. The cleaned mud is then returned down hole through the drill pipe.

BRIEF DESCRIPTION OF THE DRAWINGS

FIG. 6 is a flowchart illustrating a process for automatic calibration of a WOB sensor measurement accounting for mass effects according to an embodiment of the invention.

DETAILED DESCRIPTION

A system and method for automatic weight-on-bit sensor calibration is described. In the following description, for purposes of explanation, numerous specific details are set forth in order to provide a thorough understanding of the exemplary embodiments. It is apparent to one skilled in the art, however, that embodiments of the present invention can be practiced without these specific details or with an equivalent arrangement. In some instances, well-known structures and devices are shown in block diagram form in order to avoid unnecessarily obscuring the embodiments.

Figure 1:
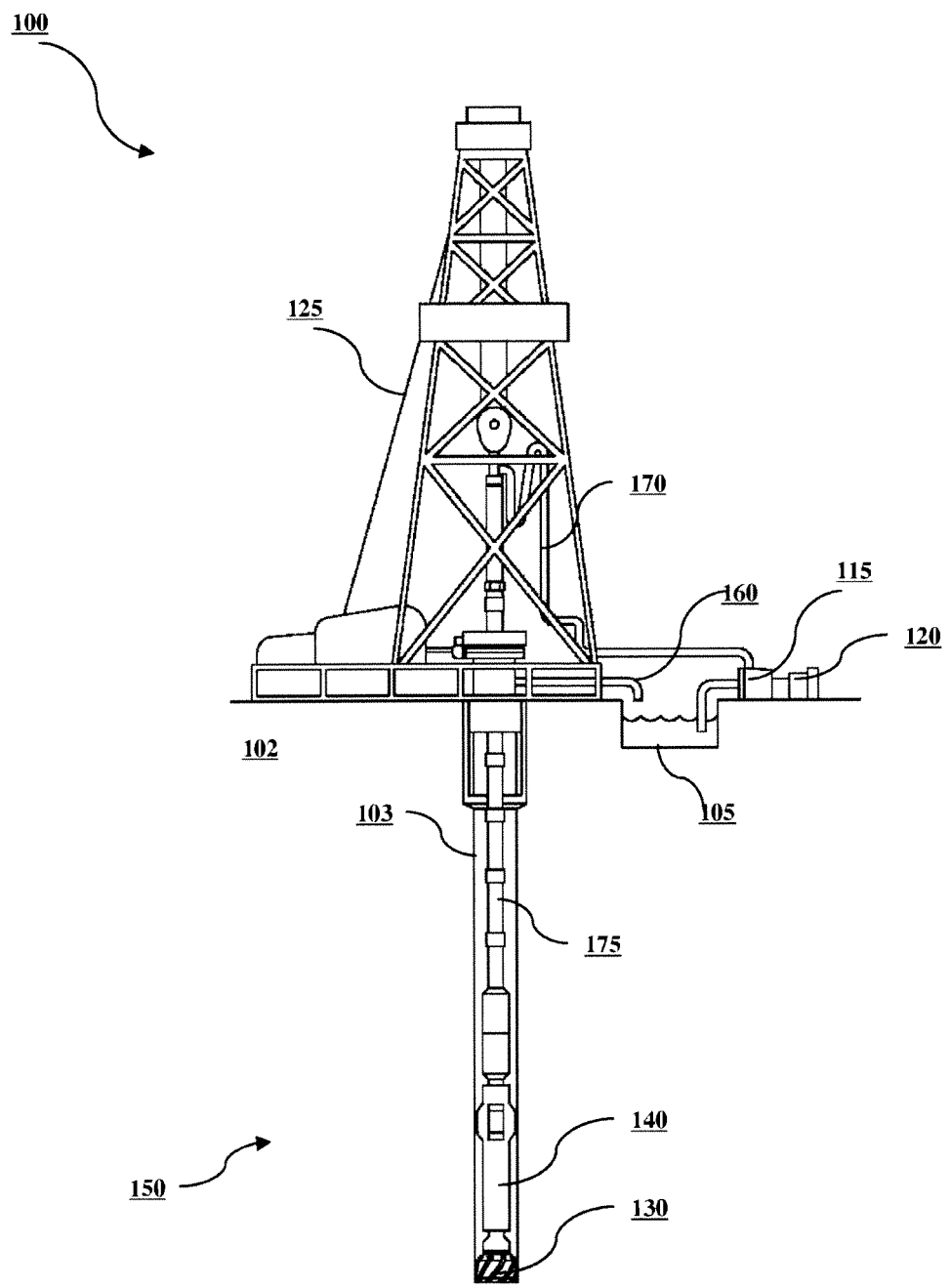
FIG. 1 illustrates a rotary drilling rig according to an embodiment of the invention.

Referring now to the drawings, FIG. 1 illustrates an exemplary rotary drilling rig 100 that can be employed in concert with embodiments of the invention. Boreholes can be created by drilling into the earth using drilling rig 100. Rig 100 drives a bottom hole assembly (BHA) 150, positioned at the bottom of drill string 175, into earth 102. BHA 150 comprises a drill bit 130 and tool string 140, which can be moved up and down through annulus 103 facilitated by drill line 125. Drill bit 130 is provided with sufficient weight-on-bit (WOB) and torque to create a hole. BHA 150 also provides directional control of drill bit 130. Tool string 140 can be semi-permanently mounted with measurement tools (not shown), such as measurement-while-drilling (MWD) and logging-while-drilling (LWD) tools, that take down hole measurements of drilling conditions, as described further herein. In another embodiment, the measurement tools are self-contained within tool string 140, as shown in FIG. 1.

Fluid, or "mud," from mud tank 105 is pumped down hole by mud pump 115 (powered by power-source 120) through stand pipe 170. The mud cools drill bit 130, circulates through annulus 103, and returns drill cuttings, such as sand and shale, to the surface. The cuttings and mud mixture is passed through flow line 160 and into a shaker and optional centrifuge (not shown), which separates the majority of solids, such as cuttings and fines, from the mud, and returns the cleaned mud down hole through stand pipe 170. Changes in various factors, such as change in rate of penetration (ROP) or formation, can be observed, analyzed and accounted for during this process. Although referenced herein for convenience as "mud," the term "mud" can mean both clean drilling fluid and a drilling fluid/cuttings mixture.

Although shown and described with respect to a rotary drill system in FIG. 1, many types of drills can be employed in carrying out embodiments of the invention, such as, for example, Auger drills, air core drills, cable tool drills, diamond core drills, percussion rotary air blast (RAB) drills, reverse circulation drills, and the like. Drills and drill rigs used in embodiments of the invention can be used onshore (as shown and described with respect to FIG. 1), or offshore (not shown). Offshore oil rigs that can be used in accordance with embodiments of the invention include, for example, floaters, fixed platforms, gravity-based structures, drillships, semi-submersible platform, jack-up drilling rigs, tension-leg platforms, and the like. Embodiments of the invention can be applied to rigs ranging anywhere from small in size and portable, to bulky and permanent.

Further, although described herein with respect to oil drilling, embodiments of the invention can be used in many other applications. For example, disclosed methods can be used in drilling for mineral exploration, environmental investigation, natural gas extraction, underground installation, mining operations, water wells, geothermal wells, and the like. Further, embodiments of the invention can be used in weight-on-packers assemblies, in running liner hangers, in running completion strings, etc.

Figure 2:
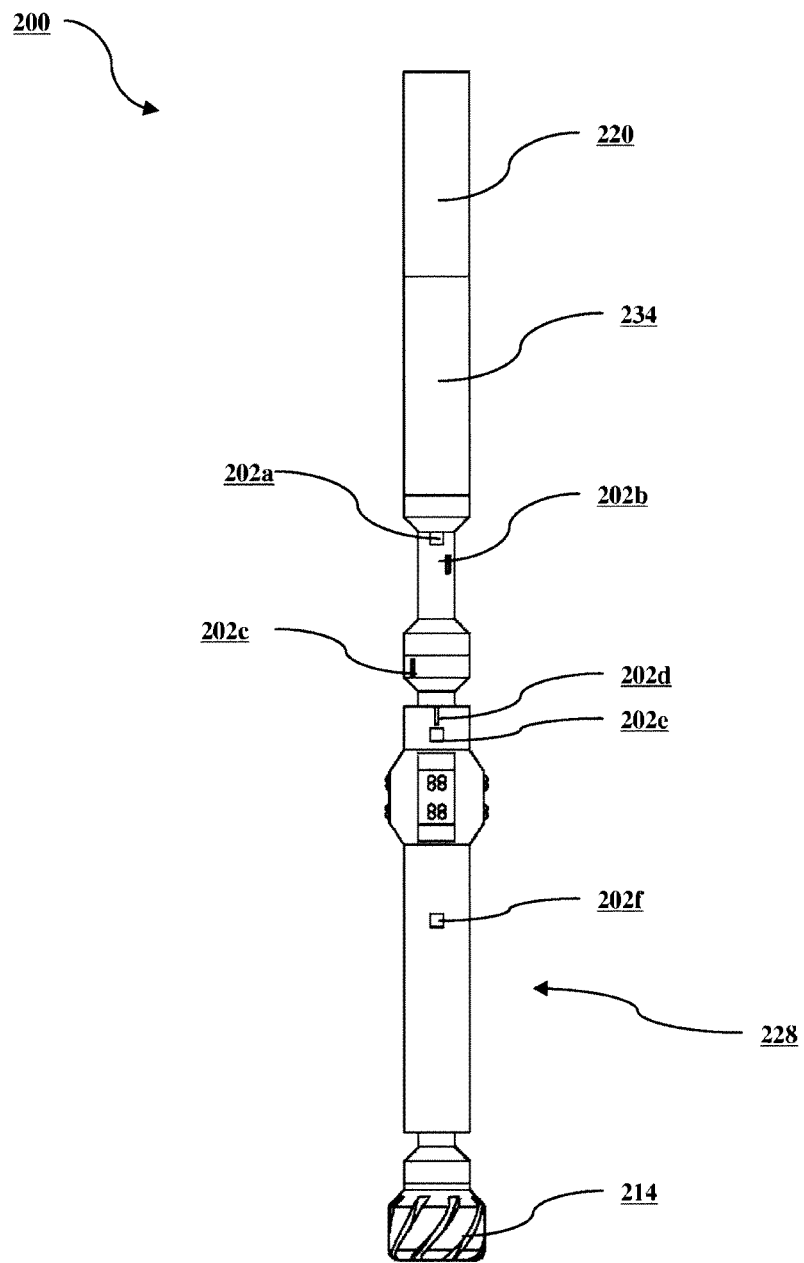
FIG. 2 illustrates a bottom hole assembly according to an embodiment of the invention.

FIG. 2 illustrates an exemplary bottom hole assembly (BHA) 200 that can be employed in concert with embodiments of the invention. Although described throughout with respect to a BHA, the embodiments of the invention described herein and throughout can be alternatively or additionally applied at multiple locations throughout a drill string, and are not limited to the BHA. As shown, BHA 200 comprises a drill bit 214, rotary steerable tool 228, sensors 202a-f, MWD/LWD tool 234, and drill collar 220. Extending above drill collar 220 (not shown) can be one or more transition drill pipes for reducing bending stresses between BHA 200 and the drill string, followed by interconnected sections of drill pipe.

MWD/LWD tool 234 can include one or more MWD tools and/or LWD tools, as well as any corresponding accessories, such as electronics, batteries, transmitters, receivers, and the like. Measurements from MWD/LWD tool 234 can be processed on the surface and/or down hole. MWD/LWD tool 234 can be battery driven or generator driven. Such batteries or generators can be provided on the surface or at any point down hole or within BHA 200. MWD/LWD tool 234 can have internal sensors or external sensors, such as sensors 202a-f. Sensors 202a-f can be any number of sensors described herein. For example, sensor 202a can be an inclinometer; sensors 202b, 202c and 202d can be reference locations for a compass unit internal or external to MWD/LWD tool 234; sensor 202e can be a shaft position sensor; and sensor 202f can be a weight-on-bit (WOB) sensor. In another embodiment, WOB sensor 202f can be positioned on BHA 200 in closer proximity to drill bit 214 (not shown). Further, inclinometer 202a can be positioned on BHA 200 in closer proximity to drill bit 214 (not shown), and can be a near-bit inclinometer or at-bit inclinometer.

MWD tools can collect, for example, directional information, mechanical information, formation information, and the like. Directional information may be collected from survey probes, inclinometers (such as near bit inclination, or NBI, sensors), accelerometers and/or magnetometers (e.g., compasses) to measure inclination and the azimuth of the hole. Mechanical information collected may include, for example, the rotational speed of the drill string, the smoothness of rotation, any vibrational movement, down hole temperature, torque, weight on drill bit 214 (measured, for example, by a WOB 202f), mud flow volume, and the like. This information is typically used to evaluate conditions at drill bit 214. Formation information and down hole geological characteristics, such as density, porosity, resistivity, acoustic-caliper measurements, inclination at drill bit 214 ("near bit inclination", or NBI), magnetic resonance, pressure and gamma ray values, can be gathered by, for example, gamma ray sensors, formation resistivity tools, magnetometers, density tools, acoustic transducers, and the like.

Alternative or additional to MWD tools, logging-while drilling (LWD) tools can be used to take various down hole measurements, including the above-mentioned directional data, mechanical data, formation data, and the like. In one embodiment, MWD tools are used to gather directional data and mechanical data, while LWD tools are used to gather formation data. In some embodiments, the MWD tools and LWD tools are in communication with one another to share collected data therebetween.

Wireline sensors can be incorporated into the drill string and work independently, or can be used in concert with MWD tools in MWD/LWD tool 234. Likewise, in another embodiment, LWD tools can be incorporated into a wireline tool assembly (not shown), described further herein. Logging tools can include both open hole electric line tools and cased hole electric line tools. Open hole electric line tools include, for example, natural gamma ray tools, nuclear tools (such as density tools and neutron tools), resistivity tools, sonic and ultrasonic tools, magnetic resonance tools, borehole seismic tools, and the like. Cased hole electric line tools can include, for example, cement bond tools, casing collar locators, gamma perforating tools, setting tools, and the like.

A wireline tool assembly can be tens or hundreds of feet long with one or more of the above-mentioned LWD sensors installed thereon to perform their respective operations at the same time. In oil drilling environments, the wireline typically resides on the surface, and can be portable or permanently affixed to the drilling rig. The wireline is wound about a large spool, which is rotationally driven by a motor or tractor, thus raising and lowering the logging tools out of and into the hole. Alternatively, the wireline can be manually raised and lowered. The wireline assembly can also include a cable head electrically connecting a power source to the tool string, and a measuring head for measuring wireline data.

LWD tools can alternatively or further be used in conjunction with coiled tubing. Unlike wirelines, coiled tubing is rigid, usually metal, piping, and thus can be pushed down hole, rather than relying on gravity. In addition to performing LWD measurements, coiled tubing can also be used in circulation, pumping, drilling and production. Still further, LWD tools can be used in conjunction with a slickline.

MWD/LWD tool 234 can further include a telemetry module for transmitting measurements to the surface, if desired, using mud pulse telemetry and/or electromagnetic telemetry. Alternatively or additionally, a wired drill pipe (not shown) can be used for two-way data transmission. In an embodiment using a wired drill pipe, tool string 140 and drill string 175 of FIG. 1 have electrical wires built in to one or more of their components such that measurements and signals from the MWD tools are carried directly to the surface at high data transmission rates. Alternatively or additionally, signal wires can be incorporated into wirelines, coiled tubing, or slicklines, to directly transmit LWD data.

Drill collar 220 adds weight to BHA 200 above drill bit 214 in FIG. 2, so that there is sufficient weight on drill bit 214 to drill through the requisite geological formations. Thus, drill collar 220 is typically made of a heavier material than the drill pipe when hard rock is to be drilled. Weight can be added or removed from drill collar 220 according to the particular application. Also or alternatively, one or more drill collars can be positioned below WOB sensor 202f. Drill collar 220 can be a "smart collar", i.e., a collar containing MWD/LWD tools, or a "dumb collar", i.e., a collar containing no MWD/LWD tools.

WOB sensor 202f is provided above drill bit 214 and a portion of rotary steerable tool 228. At vertical, WOB sensor 202f measures the weight or compression applied to drill bit 214, minus the weight of the material below WOB sensor 202f that is attributed to gravity. Because WOB sensor 202f is not at the bottom of drill bit 214, changes in hole inclination can skew the WOB measurement if WOB sensor 202f is not calibrated. In addition, buoyancy, drag and mud flow rate can all affect the measurement of WOB sensor 202f if it is not calibrated.

Embodiments of the invention automatically compensate the measurements of WOB sensor 202f based on, for example, one or more of mass, hole inclination, buoyancy, drag, and mud flow, resulting in a more accurate applied WOB measurement at various hole inclinations. This measurement can be observed by removing some of the effects masking the actual force being applied to the axial face of the drill bit. However, although described and illustrated herein with respect to a WOB sensor, embodiments of the invention can be applied to any type of weight sensor.

Figure 3:
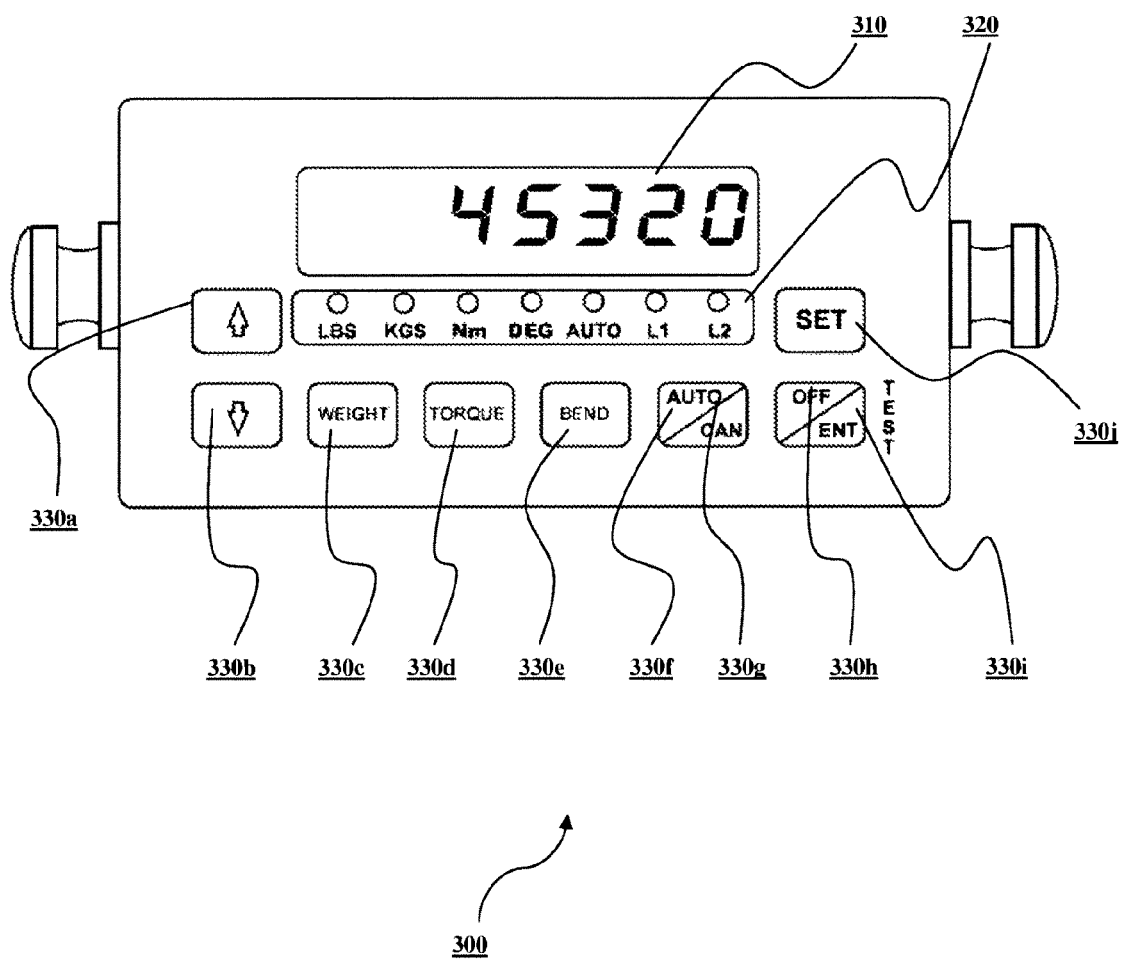
FIG. 3 illustrates a weight-on-bit (WOB) interface according to an embodiment of the invention.

FIG. 3 illustrates an exemplary WOB interface 300 comprising both output (display 310 and indicator lights 320) and input (buttons 330a-j) portions. Although shown and described having both input and output capabilities, a WOB interface having only input or only output capabilities can also be used with embodiments of the invention. Further, as described herein, a WOB interface does not have to be used at all, or can be integrated into another interface. For example, a WOB interface according to embodiments of the invention can be incorporated into the Tare Manager tool of the InSite® software package from Halliburton Energy Services Inc.

In FIG. 3, display 310 displays a WOB measurement received from a down hole WOB sensor to an operator. Although WOB interface 300 is shown and described as a digital WOB interface, any type of WOB interface can be used with embodiments of the invention. For example, the WOB interface can be an analog weight interface. Further, either or both of an analog weight interface and a digital weight interface can be incorporated into an integrated multi-functional driller's console or surface display, such as a computer screen.

When not calibrated, the weight received from the WOB sensor and reflected on display 310 does not account for hole inclination, and is thus inaccurate. To reduce the severity of inaccurate readings from uncalibrated WOB sensors, frequent bias correction measurements must be made when the hole inclination changes. Embodiments of the invention avoid this necessity by automatically compensating WOB sensor measurements based on hole inclination. Thus, the frequency of tare measurements can be greatly reduced, and less "bumping" in data values will be observed when new tare values are introduced. Constant tare measurements can be made "on the fly" using embodiments of the invention while simultaneously drilling or moving the pipe. Application of such embodiments ultimately save rig time and costs by reducing time spent calibrating the WOB sensor over the drill run. Thus, drilling operations are optimized.

In addition, by calibrating the WOB sensor to provide a more accurate WOB reading, the mechanical efficiency of the drill bit can be more accurately evaluated to see how well the bit is operating. For example, a WOB measurement displayed on display 310 that is higher than the true WOB may lead an operator to conclude that the drill bit is becoming dull or that the rock is harder than it actually is. Such a conclusion could lead to early replacement of the bit. Conversely, a WOB measurement displayed on display 310 that is lower than the true WOB could lead an operator to incorrectly conclude that the rock is softer than it actually is. In the example of unrecognized WOB, such a conclusion could lead to a damaged or broken BHA, including the bit, damaged or broken bearings and/or a stalled or damaged motor. Thus, a more accurate WOB determination can improve reliability and allow the operator to stay within operating limits and make better informed decisions, particularly when drilling directional wells. In addition, a more accurate WOB can be used to increase steering performance, optimize drilling speed and minimize cost per foot.

A more accurate WOB reading can be used to optimize drilling in a variety of other ways as well. For example, the operator can draw more accurate conclusions about down hole conditions in order to maintain optimal drilling parameters. Further, a more accurate WOB reading can be used to recommend or make changes in drilling parameters in automated traction and drilling systems, with or without the intervention of an operator. Embodiments achieving these benefits and others are described further herein with respect to the following figures and examples.

Mass Effects

Figure 4:
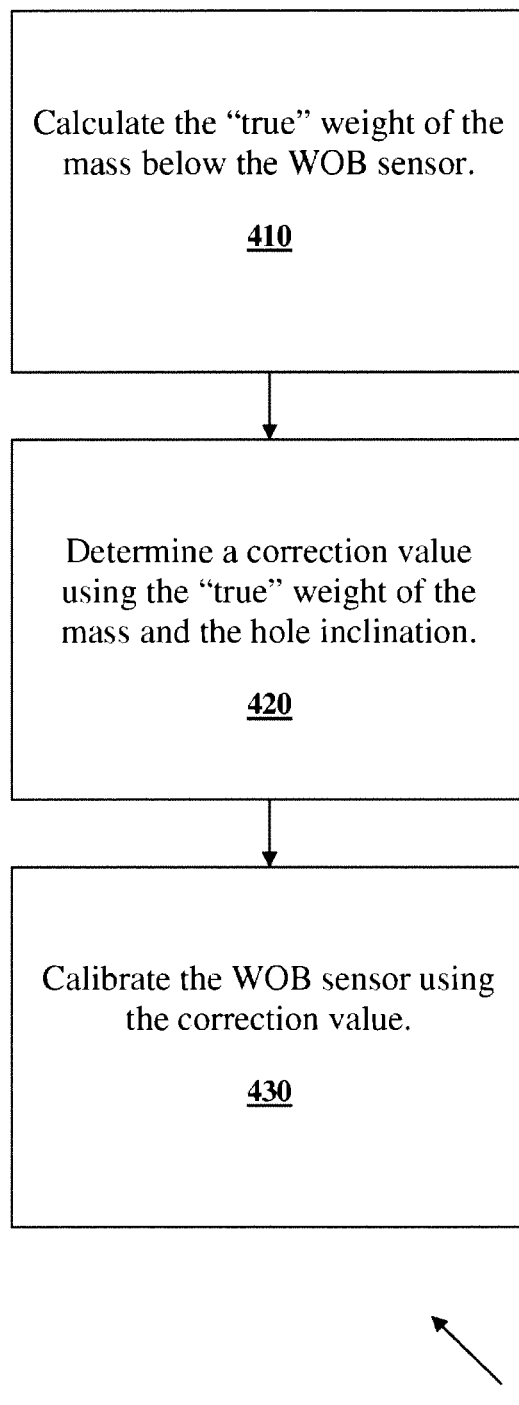
FIG. 4 is a flowchart illustrating the steps of a method for automatic WOB sensor measurement calibration accounting for mass effects according to an embodiment of the invention.

FIG. 4 is a flowchart 400 illustrating a process for automatic WOB sensor calibration accounting for mass effects according to an embodiment of the invention. At 410, the "true" weight of the BHA below the WOB sensor, $F_g$, is initially calculated representing the net axial downward force of gravity applied to the mass in a vertical free hanging position. $F_g$ represents the "true" weight of the BHA below the WOB sensor because it is adjusts a WOB sensor-measured weight to account for the angle at which the BHA below the WOB sensor is hanging when the WOB sensor measurement is made. In this sense, weight is defined as the force applied to a mass in the vertical down direction by the gravitational pull of the Earth.

Figure 5A:
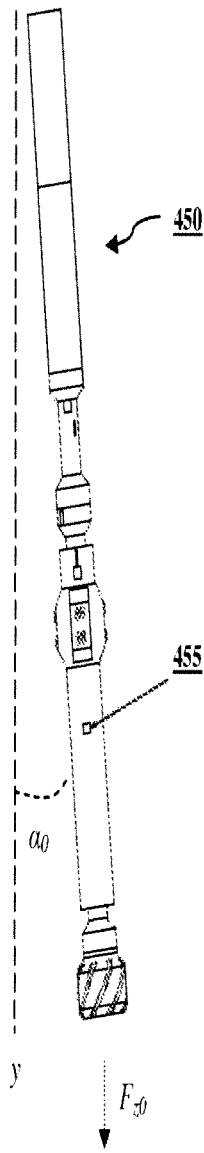
FIGS. 5A-C illustrate bottom hole assemblies at various hole inclinations according to an embodiment of the invention.

To determine the "true" weight of the BHA below the WOB sensor $F_g$ in this embodiment, an initial off-bottom z-axis weight of the BHA below the WOB sensor, $F_{z0}$, is measured, and adjusted to account for initial hole inclination $\alpha_0$. FIG. 5A illustrates the initial z-axis weight of BHA 450 below WOB sensor 455, $F_{z0}$, at an initial hole inclination $\alpha_0$.

$F_{z0}$ can be determined by one or more of a variety of methods. For example, $F_{z0}$ can be estimated by using the sum of the weight of the components of the BHA below the WOB sensor. $F_{z0}$ can also be measured directly by the WOB sensor with the BHA off-bottom. In that embodiment, $F_{z0}$ can be accurately measured with the BHA hanging loosely in a straight, approximately vertical position, with the pumps off, and with minimal movement of the drill string, as shown in FIG. 5A.

Initial hole inclination $\alpha_0$ can also be determined by one or more of a variety of methods. For example, initial hole inclination $\alpha_0$ can be manually obtained using a pendulum mechanism and measuring the deviance of the pendulum from vertical. In another example, measurement tools as described above, such as inclinometers, using accelerometers, can be used to obtain initial hole inclination $\alpha_0$. Initial hole inclination $\alpha_0$ is measured from a perfect vertical y, represented by 0° in this embodiment, as shown in FIG. 5A.

Figure 5B:
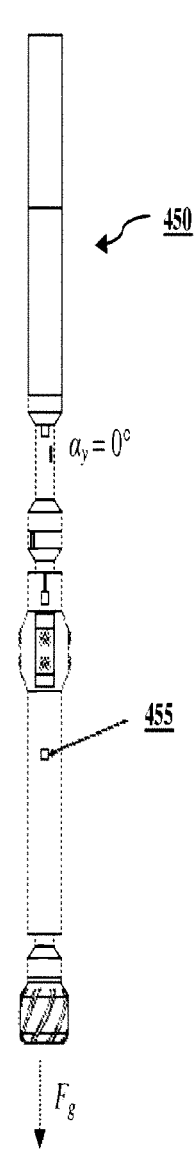

Once the initial off-bottom weight $F_{z0}$ and the initial hole inclination $\alpha_0$ are determined, the "true" weight of the mass below the WOB sensor $F_g$ is calculated using the following equation, if $\alpha_0$ is not zero:

$$F_g = \frac{F_{z0}}{\cos(\alpha_0)} \qquad \text{Equation (1)}$$

where $F_g$ is the "true" weight of the mass below the WOB sensor, $F_{z0}$ is the initial measured off-bottom weight of the mass below the WOB sensor, and $\alpha_0$ is the initial hole inclination. FIG. 5B illustrates the "true" weight $F_g$ of the BHA 450 below the WOB sensor 455 at a vertical y (i.e., $\alpha_y=0°$). In other words, $F_g$ is $F_{z0}$ adjusted to account for initial hole inclination $\alpha_0$ in this embodiment.

As initial hole inclination $\alpha_0$ approaches horizontal, $F_g$ becomes undefined. However, through limits analysis, it can be understood that:

$$\lim_{\alpha_0 \cdot 90°} f(F_g) = 0 \qquad \text{Equation (2)}$$

By definition of the gravity vector, its direction is always down, and there is no z-axis effect by gravity at a 90° angle. Thus, as hole inclination $\alpha_0$ gets closer to 90°, gravity has less of an effect on the measured weight of the BHA below the WOB sensor.

The "true" weight of the BHA below the WOB sensor $F_g$ can also be estimated at vertical by weighing the individual components of the BHA positioned below the WOB sensor, as well as the portion of the WOB sensor itself below the actual sensor point. Likewise, $F_g$ can be estimated based on previous experience. These alternative methods of determining $F_g$ can be particularly useful to avoid hanging the components together to measure the initial weight at vertical.

Once the $F_g$ representing the "true" weight below the WOB sensor is calculated, the correction value at subsequent hole inclinations $\alpha_n$ is determined at 420 of FIG. 4 using the following equation:

$$CV_n = F_g \cdot \cos \alpha_n \qquad \text{Equation (3)}$$

The "true" weight applied to the drill bit, $F_{WOBn}$, can then be determined at these subsequent hole inclinations. The "true" WOB $F_{WOBn}$ is calculated using the following equation:

$$F_{WOBn} = F_{zn} - F_g \cdot \cos(\alpha_n) \qquad \text{Equation (4)}$$

where $F_{WOBn}$ is the "true" WOB at a subsequent position number n, $F_{zn}$ is the z-axis measured WOB at a subsequent position number n, $F_g$ is the "true" weight of the mass below the WOB sensor as previously calculated, and $\alpha_n$ is the hole inclination at a subsequent position number n.

Figure 5C:
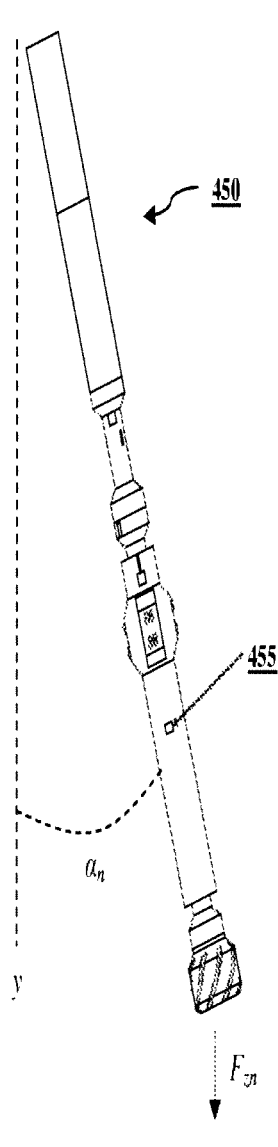

BHA 450 is illustrated in FIG. 5C at subsequent position number n. At this position, the portion of BHA 450 below WOB sensor 455 has a z-axis weight $F_{zn}$ at a hole inclination $\alpha_n$. According to Equation (4), the "true" weight $F_g$ of BHA 450 below WOB sensor 455 is adjusted by hole inclination $\alpha_n$ to determine the correction value $CV_n$, representing the weight of BHA 450 below WOB sensor 455 at a particular inclination $\alpha_n$. Correction value $CV_n$ is subtracted from the WOB $F_{zn}$ measured by the WOB sensor 455, to obtain the "true" WOB $F_{WOBn}$, without the weight of the mass below the sensor. In other words, assuming that the only forces acting upon BHA 450 below WOB sensor 455 are its own weight and the force being applied to the drill bit for drilling, then $F_{WOBn}$ equals only the applied force on the drill bit by Equation (4).

At 430 of FIG. 4, the WOB sensor is calibrated using the correction value $CV_n$. For example, the WOB sensor can be automatically set to zero at the correction value $CV_n$ at that inclination. Alternatively, the WOB sensor can automatically subtract the correction value $CV_n$ from the measured WOB $F_{zn}$ at that inclination. In either case, the WOB sensor thereafter transmits only a "true" WOB $F_{WOBn}$ to the WOB interface.

Hole inclination $\alpha_n$ can be continuously measured at subsequent position numbers n+1, n+2, n+2, . . . , etc., correction value $CV_n$ can be continuously calculated based on the subsequent hole inclinations, and the measured weight $F_{zn}$ can be continuously monitored. Thus, correction value $CV_n$ can be set as zero whenever the hole inclination $\alpha_n$ and/or the measured weight $F_{zn}$ changes. This allows the effects of gravity on the axial force to be adjusted automatically based on the inclination of the BHA, thus avoiding the need to take a bias correction measurement on a frequent basis.

Although described above and further throughout the embodiments as a calibration of the WOB sensor, similar advantages can be reached by automatically calibrating the WOB interface or a separate device. For example, the WOB sensor can transmit only the measured WOB $F_{zn}$ to a digital WOB interface. Then, the WOB interface can itself obtain hole inclination $\alpha_n$, calculate the correction value $CV_n$ and either (a) zero itself to the correction value $CV_n$, or (b) subtract the correction value $CV_n$ from the measured WOB $F_{zn}$, to thereafter display only the "true" WOB $F_{WOBn}$ when subsequent measurements are made at the same inclination. In this embodiment, only the WOB interface is calibrated, and the WOB sensor remains unchanged. In still another embodiment, a device independent of both the WOB sensor and the WOB interface can (a) receive the measured WOB $F_{zn}$ from the WOB sensor, (b) receive the hole inclination $\alpha_n$ from another measurement tool, (c) calculate the "true" WOB $F_{WOBn}$, and (d) transmit $F_{WOBn}$ to the WOB interface. In this embodiment, both the WOB sensor and the WOB interface remain unchanged, and only the separate device is calibrated. In other words, correction according to embodiments of the invention can be applied down hole and/or at the surface, and is not limited to one or the other.

FIG. 6 is a flowchart 500 illustrating a process for in hole calibration of a WOB sensor that self-corrects for changes in inclination according to another embodiment of the invention. The process starts at processing block 510. At processing block 520, a BHA is tripped into a borehole a short distance. At processing block 530, the initial z-axis weight of the BHA $F_{z0}$ below the WOB sensor and initial hole inclination $\alpha_0$ are measured near the WOB sensor using, for example, the WOB sensor and a near-bit inclination (NBI) sensor, respectively.

At optional decision block 540, it is determined whether initial hole inclination $\alpha_0$ is zero, representing a vertical inclination. If $\alpha_0$ is zero, the method continues at processing block 550a, where the initial measured weight $F_{z0}$ is set as the correction value $CV_0$. In other words, at a vertical inclination, the initial measured weight $F_{z0}$ can be estimated to be equal to correction value $CV_0$. Although not shown in this example, the initial measured weight $F_{z0}$ can be estimated to be equal to correction value $CV_0$ at other inclinations determined to have negligible or minimal effects on the initial measured weight $F_{z0}$, such as, for example, $\alpha_0 \leq 10°$.

If $\alpha_0$ is not zero, the "true" weight of the mass below the WOB sensor, $F_g$, is calculated by, for example, dividing $F_{z0}$ by the cosine of $\alpha_0$, as shown in Equation (1), and the "true" weight $F_g$ is set as the correction value $CV_0$. In either case, at processing 560, the pipe is drilled or moved to a subsequent position number n. Note that the use of n is used interchangeably herein to indicate consecutive position numbers, measurement numbers or sample numbers, and that it is purely exemplary and explanatory in nature.

The measured weight at position number n, $F_{zn}$, and the hole inclination at position number n, $\alpha_n$, are measured at processing block 570, and it is determined whether the hole inclination has changed from the previous hole inclination measurement, i.e., the measurement taken at position n−1. If $\alpha_n$ does not equal $\alpha_{n-1}$, i.e., the inclination has changed, the method continues at processing block 585, where the correction value is updated according to the Equation (3), i.e., $CV_n = F_g \cdot \cos(\alpha_n)$, and the method proceeds to processing block 590. If $\alpha_n$ equals $\alpha_{n-1}$ (i.e., the inclination has not changed), the method proceeds straight to processing block 590.

At processing block 590, the measured weight $F_{zn}$ is adjusted by the correction value $CV_n$, establishing the "true" WOB, $F_{WOBn}$, without the effects of mass. The WOB sensor is then calibrated to reflect this "true" WOB, $F_{WOBn}$. At decision block 595, it is determined whether drilling is continuing. If drilling continues, position number n is set as n=n+1, and the method loops back to processing block 560. If drilling does not continue, the method concludes with processing block 599, which ends the process.

Application of one embodiment of this process is described below in Example 1. For the purpose of the Examples contained herein, compressive forces applied to the WOB sensor are considered positive, and stretch forces are considered negative. Although this convention makes the effects of gravity negative instead of positive, the "true" WOB $F_{WOBn}$ is generally treated as positive for compressive forces.

Example 1

A BHA is initially tripped into a hole to a depth of 200 feet. The measured weight of the BHA at this depth is obtained from the WOB sensor, which measures $F_{z0}=-20,000$ lbs (stretch). The hole inclination at this depth is measured to be $\alpha_0=3°$. Because the hole inclination is not zero, the gravitational force $F_g$ can be calculated using Equation (1):

$$F_g = \frac{F_{z0}}{\cos(\alpha_0)} = \frac{-20,000}{\cos(3°)} = -20,027 \text{ lb}_f$$

The BHA is then tripped to bottom and drilling begins. At a subsequent position number n, the WOB sensor reflects a real-time measured weight $F_{zn}=10,000$ lbs (compression). The hole inclination at this position is measured to be $\alpha_n=22°$. The "true" WOB, $F_{WOBn}$, can then be calculated using Equation (4) based on the new inclination, the previously calculated "true" weight below the WOB sensor, and the measured WOB:

$F_{WOBn} = F_{zn} - F_g \cdot \cos(\alpha_n) = 10,000 - (-20,027) \cdot \cos(22°) = 10,000 - (-18,569) = 38,569 \text{ lb}_F$ Thus, the actual weight applied to the bit $F_{WOBn}$ at position number n is 38,569 $lb_F$. The z-axis BHA weight changed from −20,027 $lb_F$ approximately at vertical, to −18,569 $lb_F$ at 22° of inclination. The latter z-axis BHA weight is the correction value $CV_n$, which can be used to zero the WOB sensor. This correction value $CV_n$ can be continuously updated in real time as hole inclination and z-axis force measurements change while drilling.

Buoyancy Effects

Figure 7:
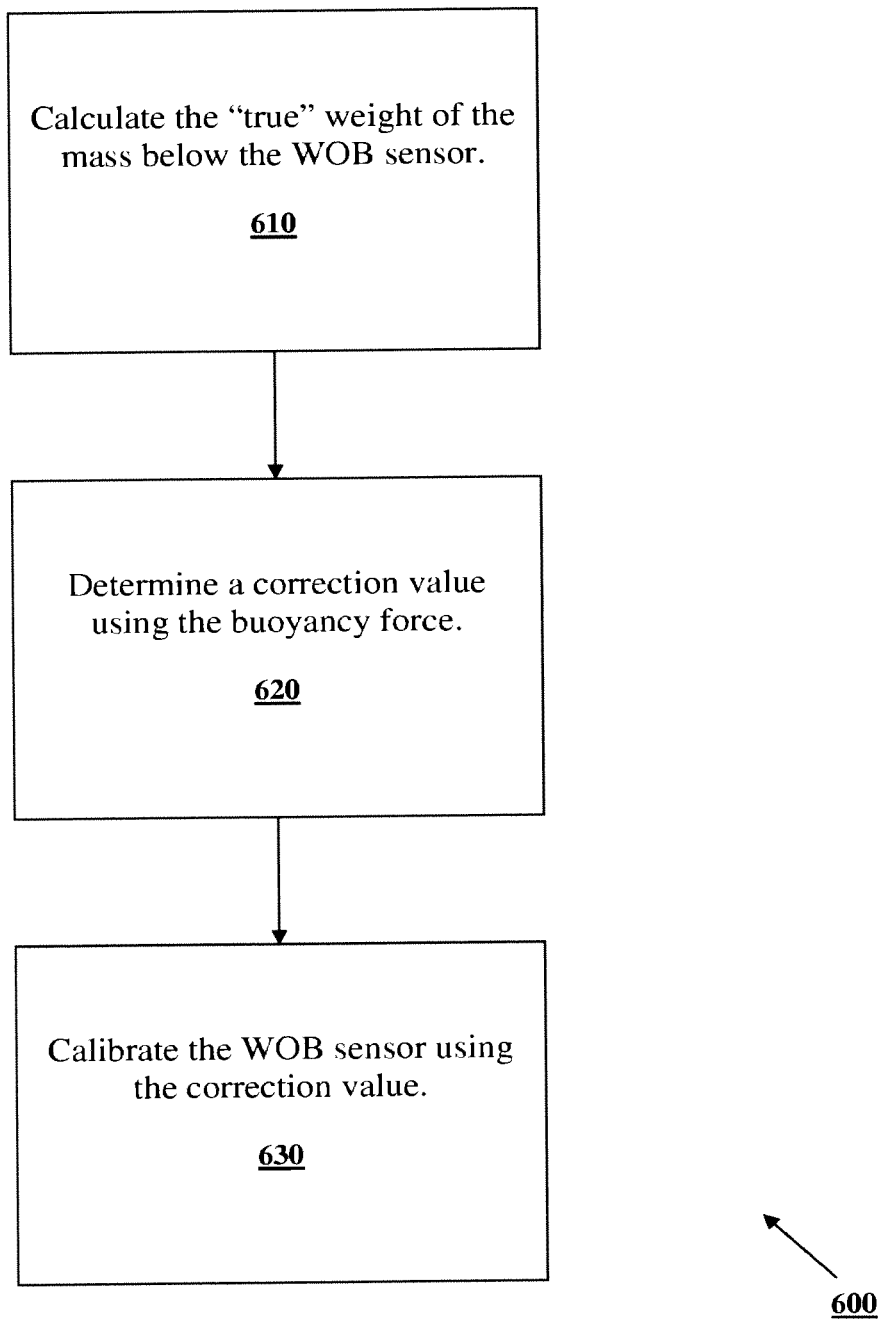
FIG. 7 is a flowchart illustrating a process for automatic WOB measurement calibration accounting for buoyancy effects according to an embodiment of the invention.

FIG. 7 is a flowchart 600 illustrating a process for automatic WOB sensor calibration accounting for buoyancy effects according to an embodiment of the invention. At 610, the "true" weight of the mass below the WOB sensor, $F_g$, is calculated or obtained according to one of the methods described above. At 620, a correction value is determined. In this embodiment, the correction value is equal to buoyancy force, $F_{bn}$, and is calculated using the "true" weight of the mass below the WOB sensor $F_g$, the hole inclination $\alpha_n$, and a ratio of density measurements. Buoyancy force $F_{bn}$ corresponds to the force applied to the axial dimension of the BHA due to gravity and the fluid below the sensor point at position number n. The buoyancy force $F_{bn}$ can be calculated by applying the following equation:

$$F_{bn} = F_g \cdot \left(\frac{\rho_{fn}}{\rho_{BHA}}\right) \cos(\alpha_n) \qquad \text{Equation (5)}$$

where $F_{bn}$ is the buoyancy force at position number n (and the correction value $CV_n$ at position number n in this embodiment), $F_g$ is the "true" weight below the WOB sensor, $\rho_{fn}$ is the average density of the mud around the BHA at position number n, $\rho_{BHA}$ is the average density of the BHA below the WOB sensor, and $\alpha_n$ is the hole inclination at subsequent position number n.

The average density of the mud around the BHA, $\rho_{fn}$, can be initially determined once and used throughout calibration. Alternatively, the average density of the mud $\rho_{fn}$ can be measured and updated either periodically or continuously to ensure that the model is reflecting any changes in mud density due to current down hole conditions. The average density of the mud $\rho_{fn}$ can be determined by weighing a sample volume of the fluid, and dividing its weight by the sample volume. Alternatively or additionally, the average density of the mud $\rho_{fn}$ can be measured by a down hole mud density sensor using the measurement tools.

The average density of the BHA below the WOB sensor, $\rho_{BHA}$, is, by definition, the weight per volume of the BHA below the WOB sensor, and can be calculated or measured by a variety of methods. For example, in situations where accuracy is desired, the portion of the BHA below the sensor (or the sum of its components) can be placed into a volume of fluid, and the displacement of the fluid can be measured to determine the volume of the BHA below the sensor. The weight of the BHA can be determined by any of the methods described above, such as directly weighing the BHA or the sum of its components, and the weight can be divided by the volume. Alternatively, the average BHA density $\rho_{BHA}$ can be estimated as or assumed to be a particular number based on previous experience or industry standards. This measurement or estimation can be used for the life of the particular BHA below the WOB sensor unless or until substantive changes are made to the BHA below the WOB sensor, such as, for example, by a cutback shortening of a tool joint in the BHA. Further, the measurement or estimation can be stored in a database and associated with a particular BHA for later reference or reuse.

Thus, the "true" weight being applied to the bit $F_{WOBn}$ without the effects of buoyancy can be calculated by subtracting the buoyancy force $F_{bn}$ (equal to the correction value $CV_n$ in this embodiment) from the measured weight $F_{zn}$, such as is shown in the below equation:

$$F_{WOBn} = F_{zn} - F_g \cdot \left(\frac{\rho_{fn}}{\rho_{BHA}}\right) \cos(\alpha_n) \qquad \text{Equation (6)}$$

Figure 8:
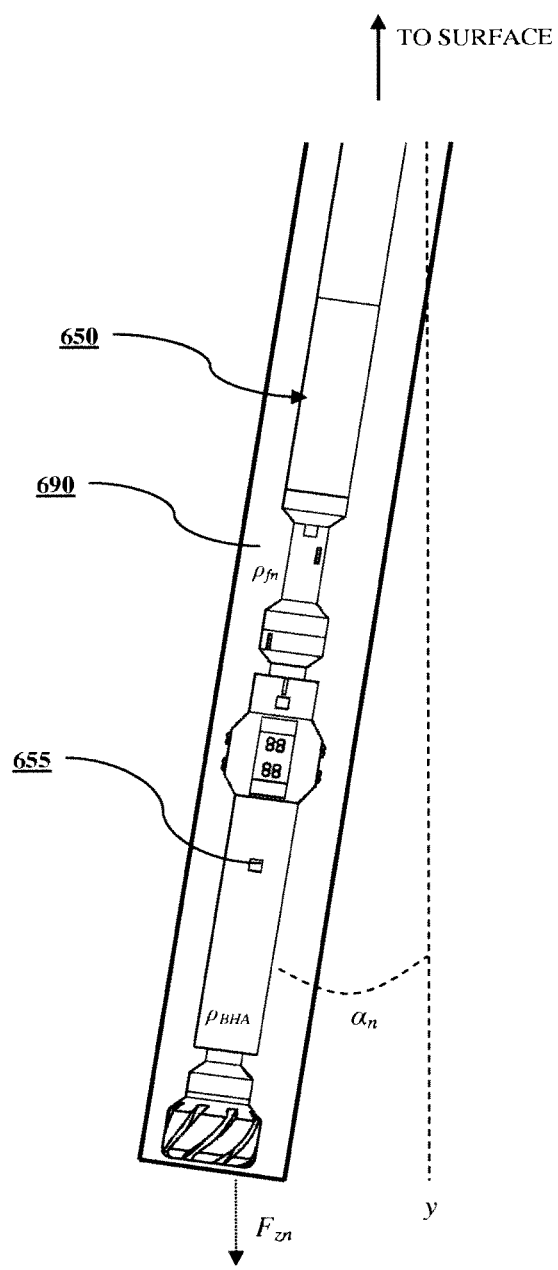
FIG. 8 illustrates a submerged bottom hole assembly at a hole inclination according to an embodiment of the invention.

BHA 650 is illustrated in FIG. 8 at a position number n. At this position, the WOB sensor 655 measures a z-axis weight $F_{zn}$ at a hole inclination $\alpha_n$. According to Equation (5), the "true" weight $F_g$ of BHA 650 below WOB sensor 655 is adjusted by hole inclination $\alpha_n$ and a ratio of the average density $\rho_{fn}$ of mud 690 over the average density $\rho_{BHA}$ of the BHA. This adjusted weight represents the net force $F_{bn}$ applied to the axial dimension of BHA 650 below WOB sensor 655 due to gravity and the buoyancy effects of mud in annulus 690 below the sensor point. Buoyancy force $F_{bn}$ is subtracted from the WOB $F_{zn}$ measured by the WOB sensor 655, to obtain the "true" WOB $F_{WOBn}$, without the net effects of mass and buoyancy at a particular hole inclination $\alpha_n$. In other words, assuming that the only forces acting upon BHA 650 below WOB sensor 655 are its own weight, the force being applied to the drill bit for drilling and the buoyancy effects caused by mud in annulus 690, then $F_{WOBn}$ equals only the applied force on the drill bit by Equation (6).

Turning back to FIG. 7, at 630, the WOB sensor is calibrated to account for changes in hole inclination and mud density using the correction value, here equal to buoyancy force $F_{bn}$. Application of an embodiment of the process is described below with respect to Example 2.

Example 2

At an initial position, the "true" weight of the mass below the WOB sensor $F_g$ is determined to be $-20{,}027$ lb$_F$. The initial hole inclination is measured as $\alpha_0 = 0°$, the initial average mud density $\rho_{f0}$ as 13 lb/gal, and the average BHA density $\rho_{BHA}$ is assumed to be 65.5 lb/gal, which is a general density estimation for drill pipes. Thus, initial buoyancy force $F_{b0}$ at the vertical free hanging position can be calculated as follows using Equation (5):

$$F_{b0} = -20{,}027 \cdot \left(\frac{13}{65.5}\right) \cos(0°) = -20{,}027 \cdot 0.1985 = -3{,}975 \text{ lb}_F$$

In other words, when calculated at $\alpha_0 = 0°$, $F_{b0}$ represents the free hanging weight of the BHA in the drilling fluid.

At a subsequent position number n, the hole inclination is measured to be $\alpha_n = 22°$. The average mud density $\rho_{fn}$ is assumed to remain at 13 lb/gal. The buoyancy force $F_n$ at position number n can be calculated using Equation (6):

$$F_{bn} = -20{,}027 \cdot \left(\frac{13}{65.5}\right) \cos(22°) = -20{,}027 \cdot 0.184 = -3{,}685 \text{ lb}_F$$

As can be seen from this comparative example, the change in hole inclination from $\alpha_0 = 0°$ to $\alpha_n = 22°$ can have a significant effect on the buoyancy force along the drill string axis. Thus, the WOB sensor can be automatically calibrated according to this method to account for this effect and result in more accurate measurements.

Drag Effects

Figure 9:
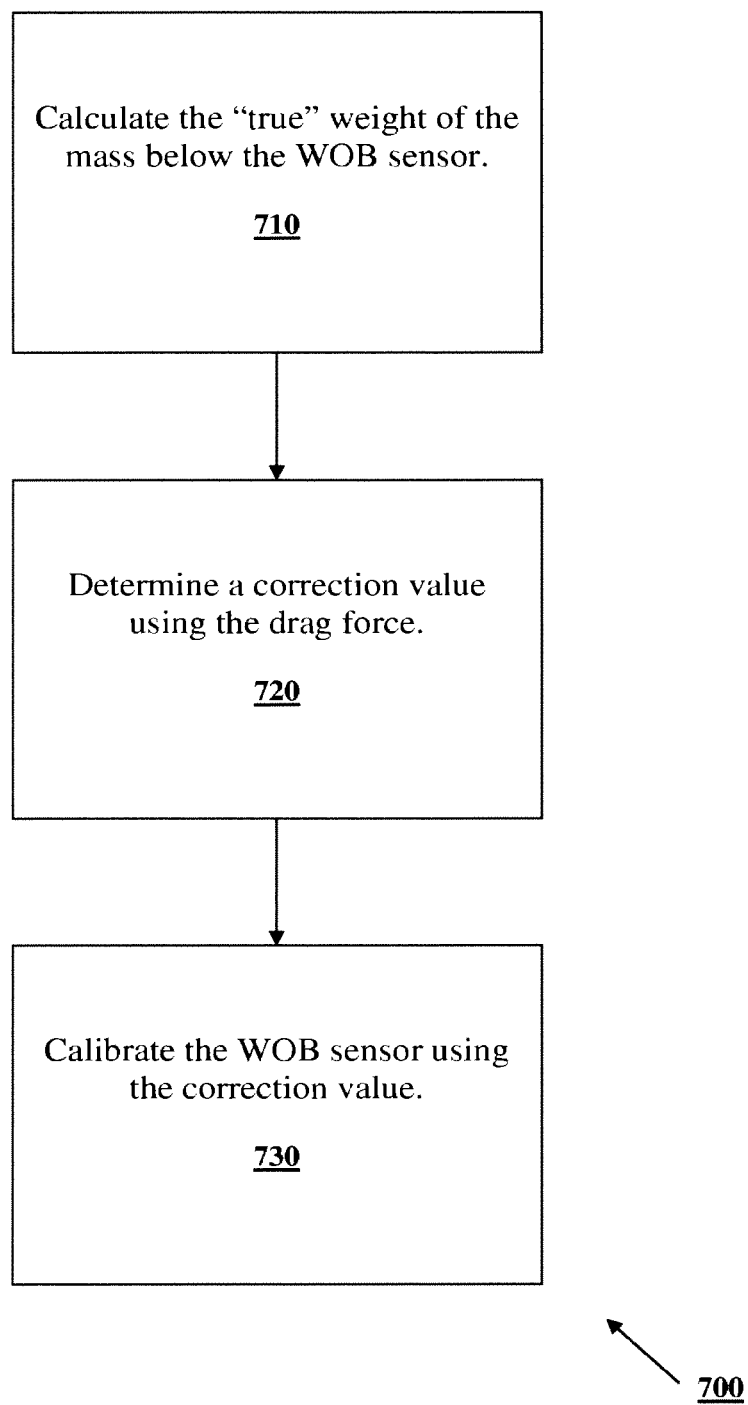
FIG. 9 is a flowchart illustrating a process for automatic WOB measurement calibration accounting for drag effects according to an embodiment of the invention.

FIG. 9 is a flowchart 700 illustrating a process for automatic WOB sensor calibration accounting for drag effects according to an embodiment of the invention. At 710, the "true" weight of the mass below the WOB sensor $F_g$ is calculated or obtained according to one of the methods described above. At 720, a correction value is determined using the "true" weight of the mass $F_g$, the hole inclination $\alpha_n$, and friction. In this embodiment, the correction value is equal to the drag force $F_{dn}$, which corresponds to a net axial force applied to the WOB sensor as a result of drag. Drag force $F_{dn}$ represents the contact force of the BHA against the bore wall below the WOB sensor. Drag force $F_{dn}$ is a function of the dynamic coefficient of friction and the applied force against the bore wall, and can be represented by the following equation:

$$F_{dn} = \mu_{dg} \cdot F_g \cdot \sin(\alpha_n) \qquad \text{Equation (7)}$$

where $F_{dn}$ is the drag force, $\rho_{dg}$ is the dynamic coefficient of friction between the bore wall and the BHA, $F_g$ is the gravitational force applied to the mass below the force sensor in the vertical free hanging position, and $\alpha_n$ is the hole inclination at position number n.

The dynamic coefficient of friction, $\mu_{dg}$, is used in Equation (7) rather than the static coefficient of friction, because it will take into account the effects of axial friction while the drill pipe is being moved. However, the static coefficient of friction can instead be used if the particular application does not involve rotation or axial movement, such as in holding stationary off-bottom, or in holding a component down in completions.

The dynamic coefficient of friction $\mu_{dg}$ can be determined by a variety of methods. For example, the change in force from the static to the dynamic can be measured while dragging the drill pipe to determine the drag force. For rotary steerable tools where the bend can be adjusted, the bend can be set to 0% and the drag test performed in a straight section of the whole where there is no interference between the BHA and the bore wall. Alternatively, dynamic coefficient of friction $\mu_{dg}$ due to gravity can be estimated by analyzing tripping data from the WOB sensor.

In general, it can be assumed that the magnitude of the drag force is the same in both directions, although it may be different in reality due to discontinuities or upset diameters (i.e., larger than normal diameters used for tool joint connections or to add weight) in the shape of the BHA. Depending on the direction of movement, however, the drag force can be either positive or negative due to the storage of potential energy through compression or extension of the BHA. For purposes of the description herein, the drag force is treated as positive if movement is in the downward direction, because it is causing the BHA to compress. If movement is in the upward direction, the drag force is treated as negative herein, because it is causing the BHA to stretch. The directionality of the movement of the drill string can be monitored at the surface or can be determined by down hole equipment such as, for example, a depth sensor.

The sign of the drag or friction coefficient can be difficult to assign without using historical information preceding the calibration sample measurement. To manage this, the compensating routine needs to know whether the drill pipe was moved upward or downward just prior to when the calibrating weight measurement is taken. If the pipe is not moving at the time of sampling the calibrating weight measurement, the last pipe movement direction sensed can be used for the sign of the coefficient. It can be assumed that once the drill pipe slows to a stop in one direction, most of the force created by the dynamic friction is retained in the BHA in static mode so long as the pipe remains stationary when the calibration sample measurement of weight is taken. This assumption is based on the fact that dynamic friction force is converted to static friction force when movement is slowed down to a stop.

Thus, the "true" WOB $F_{WOBn}$ without the effects of drag can be calculated by subtracting the drag force $F_{dn}$ (here equal to the correction value) from the measured weight $F_{zn}$, such as is shown in the below equation:

$$F_{WOBn} = F_{zn} - \mu_{dg} \cdot F_g \cdot \sin(\alpha_n) \qquad \text{Equation (8)}$$

At 730, the WOB sensor is calibrated using the correction value (here equal to the drag force $F_{dn}$). Application of an embodiment of the process is described below with respect to Example 3.

Example 3

At a vertical free hanging position, the gravitational force $F_g$ is determined to be 20,027 $lb_F$. The hole inclination is measured at position n as $\alpha_n=22°$ and the dynamic coefficient of friction as 0.02. Thus, drag force $F_{dn}$ can be calculated as follows using Equation (7):

$$F_{dn}=0.02 \cdot 20{,}027 \cdot \sin(22°)=150 \text{ lb}_f$$

At $\alpha_n=90°$, or horizontal:

$$F_{dn}=0.02 \cdot (-20{,}027) \cdot \sin(90°)=-401 \text{ lb}_f$$

Combined Gravity Effects

Figure 10:
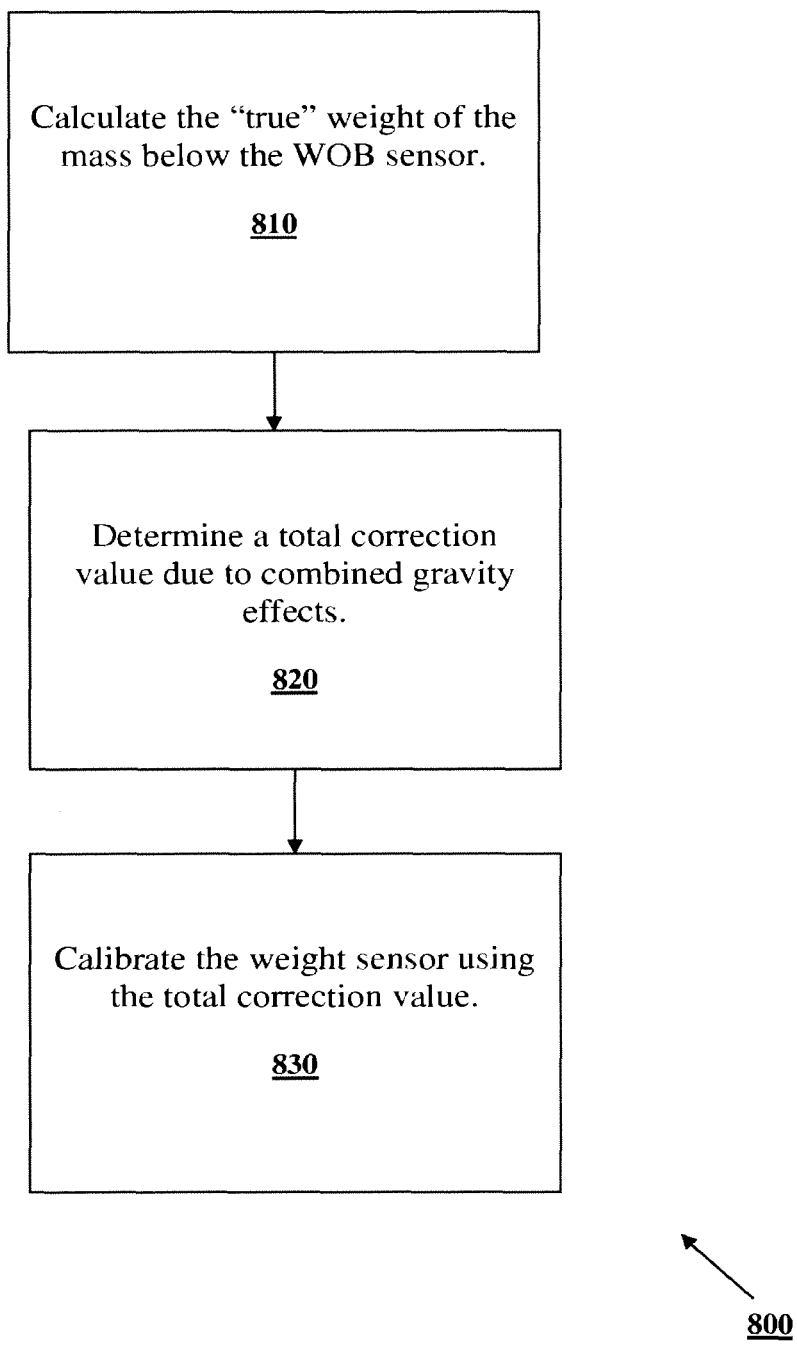
FIG. 10 is a flowchart illustrating a process for automatic WOB measurement calibration using two or more gravity-dependent forces according to an embodiment of the invention.

Two or more of the above-described gravity-dependent forces (i.e., "true" weight of the mass below the WOB sensor at a hole inclination, buoyancy force at a hole inclination, and drag force at a hole inclination) can be combined into a single equation in order to arrive a combined net axial force accounting for hole inclination that can be used to calibrate the WOB sensor. FIG. 10 is a flowchart 800 illustrating a process for automatic WOB sensor calibration using two or more of the above gravity-dependent forces. At 810, the "true" weight of the mass below the WOB sensor $F_g$ is calculated using one of the above-described methods. At 820, a total correction value $TCV_n$ due to the combined gravity effects on the WOB sensor measurement is determined by, for example, adding each of their respective correction values together. At 830, the weight sensor is calibrated using the total correction value $TCV_n$, which reflects the offset of the WOB sensor measurement due to the combined effects of the selected gravity-dependent forces on the WOB sensor.

For example, to take the effects of mass, buoyancy and drag all into account, total correction value $TCV_n$ can be expressed by the following equation:

$$TCV_n=(F_g+F_{b0}) \cdot \cos(\alpha_n)+\mu_{dg} \cdot |F_g+F_{b0}| \cdot \sin(\alpha_n) \quad \text{Equation (9)}$$

where $TCV_n$ is the total correction value at a position number n, $F_g$ is the "true" weight of the mass below the WOB sensor in a vertical free hanging position, $F_{b0}$ is the upward buoyancy force at a vertical free hanging position, $\alpha_n$ is the hole inclination at position number n, and $\mu_{dg}$ is the dynamic coefficient of friction between the bore wall and the BHA.

In the portion of Equation (9) corresponding to friction, the absolute value of $F_g+F_{b0}$ is taken, because the effect of mass and buoyancy is sign dependent on the last direction of travel, rather than on the forces applied. In other words, this portion of Equation (9) determines the equivalent mass due to buoyancy. In addition, as hole inclination $\alpha_n$ transitions to angles higher than 90°, the gravity effect reverses. Equation (9) accounts for this change automatically so that it is valid for all hole inclinations $\alpha_n$ from angles of 0° to 180°. The combined net axial force $TCV_n$ can thus be calculated and the WOB sensor calibrated "on the fly" based only on the measured hole inclination $\alpha_n$, according to the equation $F_{WOBn}=F_{zn}-TCV_n$.

Application of Equation (9) in one embodiment can be seen in Example 4 below.

Example 4

The "true" weight of the mass below the WOB sensor in a vertical free hanging position $F_g$ is determined to be −20,027 $lb_F$ and the buoyancy force $F_{b0}$ is determined to be 3,975 $lb_F$. The hole inclination is measured at an initial vertical position of $\alpha_0=0°$ and the dynamic coefficient of friction $\mu_{dg}$ as +0.02. Thus, total correction value $TCV_0$ at a vertical position can be calculated as follows using Equation (9):

$$TCV_0=(-20{,}027+3{,}975) \cdot \cos(0°)+(+0.02) \cdot |-20{,}027+3{,}975| \cdot \sin(0°)=16{,}052 \text{ lb}_F$$

The hole inclination is measured at a subsequent position 1 as $\alpha_1=22°$ and the dynamic coefficient of friction $\mu_{dg}$ is assumed to remain as +0.02, with the last direction being down. Similarly, total correction value $TCV_1$ can be calculated as follows using Equation (9):

$$TCV_1=(-20{,}027+3{,}975) \cdot \cos(22°)+(+0.02) \cdot |-20{,}027+3{,}975| \cdot \sin(22°)=-14{,}763 \text{ lb}_F$$

The hole inclination is again measured at a subsequent position 2 as $\alpha_2=90°$, or horizontal, and the dynamic coefficient of friction $\mu_{dg}$ is assumed to remain as +0.02, with the last direction being down. Total correction value $TCV_2$ can be calculated as follows using Equation (9):

$$TCV_2=(-20{,}027+3{,}975) \cdot \cos(90°)+(+0.02) \cdot |-20{,}027+3{,}975| \cdot \sin(90°)=321 \text{ lb}_F$$

The WOB sensor can be calibrated in real time at each position n according to its respective total correction value $TCV_n$.

With the BHA suspended in drilling fluid at least up to the WOB sensor point, the net value of the mass effect and the buoyancy effect can be determined in one measurement (i.e., the z-axis weight measured by the WOB sensor accounts for the both mass and buoyancy effects). This eliminates the need to measure the BHA in the air (which is sufficiently close to a vacuum for this purpose), and to independently determine the mud density and density of the BHA. Thus, in this situation, Equation (9) can be reduced further to the following equation:

$$TCV_n=F_s \cdot \cos(\alpha_n)+\mu_{dg} \cdot |F_s| \cdot \sin(\alpha_n) \quad \text{Equation (10)}$$

where $TCV_n$ is the total correction value at a position number n, $F_s$ is the net free hanging force applied to the BHA when it is suspended in fluid ($F_g+F_{b0}$), $\alpha_n$ is the hole inclination at position number n, and $\mu_{dg}$ is the dynamic coefficient of friction between the bore wall and the BHA.

The equation for $F_s$ in this situation is as follows:

$$F_s = \frac{F_{zn}}{\cos(\alpha_n)} \quad \text{Equation (11)}$$

where $F_s$ is the net free hanging force applied to the BHA when it is suspended in fluid, $F_{zn}$ is the measured weight of the mass below the WOB sensor, and $\alpha_n$ is the hole inclination at position number n.

If the BHA is instead partially submersed up to the sensor point, the total correction value $TCV_n$ would have to be separately determined and summed for the portion of the BHA in the mud (e.g., using Equations (10) and (11)) and the portion of the BHA out of the mud (e.g., using Equation (9)).

Example 5 below illustrates an embodiment applying Equations (10) and (11). Example 5 differs from Example 4 in that the BHA is submersed at least up to the WOB sensor point in Example 5.

Example 5

A BHA is initially tripped into a hole where the BHA is submerged in fluid at least up to the WOB sensor point. The WOB sensor reflects a measured weight $F_{z0}=-16,074$ $lb_F$ at a hole inclination $\alpha_0=3°$. Using Equation (11), the net free hanging force applied to the BHA when it is submersed in fluid, $F_s$, is calculated as:

$$F_s = \frac{-16,074}{\cos(3°)} = -16,052 \; lb_F$$

Moving the pipe to a subsequent position n, the total correction value $TCV_n$ can be automatically calculated based on hole inclination $\alpha_n$. For example, at position n=1 where $\alpha_1=22°$ and $\mu_{dg}=+0.02$ (assuming that the last direction was downward), the total correction value $TCV_1$ can be calculated as follows:

$TCV_1=-16,052\cdot\cos(22°)+(+0.02)\cdot|-16,052|\cdot\sin(22°)=-14,763$ $lb_F$(stretch)

Mud Flow Effects

Other variables that are not gravity based can also affect WOB sensor measurements. These variables can be accounted for independently or incorporated into the above-discussed models to further refine calibration of the WOB sensor. One example of a variable affecting WOB sensor measurements unrelated to gravity is mud flow, which can exert a variety of hydraulic forces on the WOB sensor, including, for example, (a) fluid friction force and (b) piston effects. Fluid friction force is caused by the difficulty of the first layer of fluid surrounding the BHA surface to move across and through the roughness of the surface. BHA piston effects which impact tension or compression of the BHA are caused by a reduction of cross-sectional flow area inside and/or outside of the BHA flow path over the length of the drill string below the WOB sensor. These hydraulic forces are primarily created by the pressure drop across the bit nozzles; however, other components in the BHA can also impact the overall pressure drop of the drilling fluid between the WOB sensor and the bottom of the drill bit. On the outside of the BHA, mud rings, pack offs, formation sloughing/collapse, cuttings build-up or other flow restricting actions create upward compression forces on the BHA, where as pressure drop inside the BHA between the WOB sensor and the bit create tension or stretch forces on the BHA.

As fluid flows over the surface of the BHA, either on the internal or external flow path, the first layer of fluid is generally slow-moving, as it is difficult for the fluid to move across and through the roughness of the surface The effects of mud flow on the WOB measurement can be estimated by a variety of methods. For example, a direct measurement of the effects of the flow can be made without attempting to characterize the properties of the mud, which can be repeated to re-calibrate the model when down hole conditions change. A more sophisticated model can incorporate such mud properties (e.g., changes in friction and pressure drop due to changes in yield point, plastic viscosity, density, down hole temperature, % solids, etc.). Other methods of determining the effects of mud flow include, for example, calculations based on geometries or surface finish.

In order to take a direct measurement of the effects of the mud flow on the WOB sensor, one or more flow rate measurements can be made using measurement tools such as, for example, flow-line sensors or mud flow interfaces, and one or more WOB sensor measurements can be made using the WOB sensor itself. The measurements can then be plotted at their respective flow rates, and a curve-fitting equation can be extrapolated through the data points. This curve can subsequently be used to calibrate the WOB sensor as described above to remove the effects of changes in mud flow, without requiring a new tare measurement.

Figure 11:
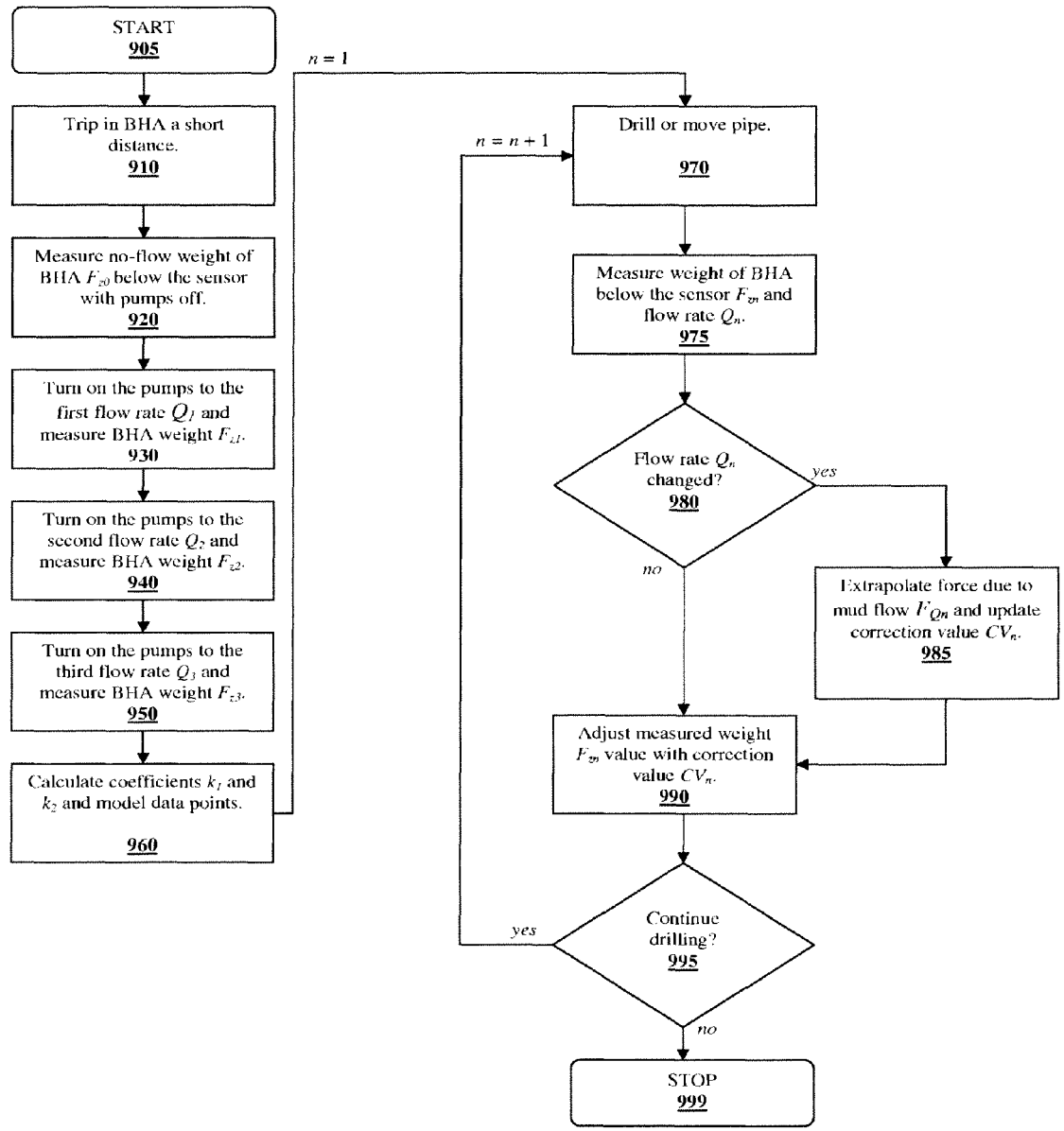
FIG. 11 is a flowchart illustrating a process for automatic calibration of a WOB sensor measurement accounting for mud flow effects according to an embodiment of the invention.

FIG. 11 is a flowchart 900 illustrating a process for in hole calibration of a WOB sensor that self-corrects for changes in mud flow according to an embodiment of the invention. The process starts at processing block 905. At processing block 910, a BHA is tripped into a borehole a short distance. Optionally, the BHA can then be pulled slightly upward and held, in order to improve measurements at non-zero hole inclinations. This optional step puts the drill string into tension, getting rid of the compressive load and thus the compressive potential energy. At processing block 920, the no-flow z-axis weight of the BHA $F_{z0}$ is measured with the pumps off.

Figure 12A:
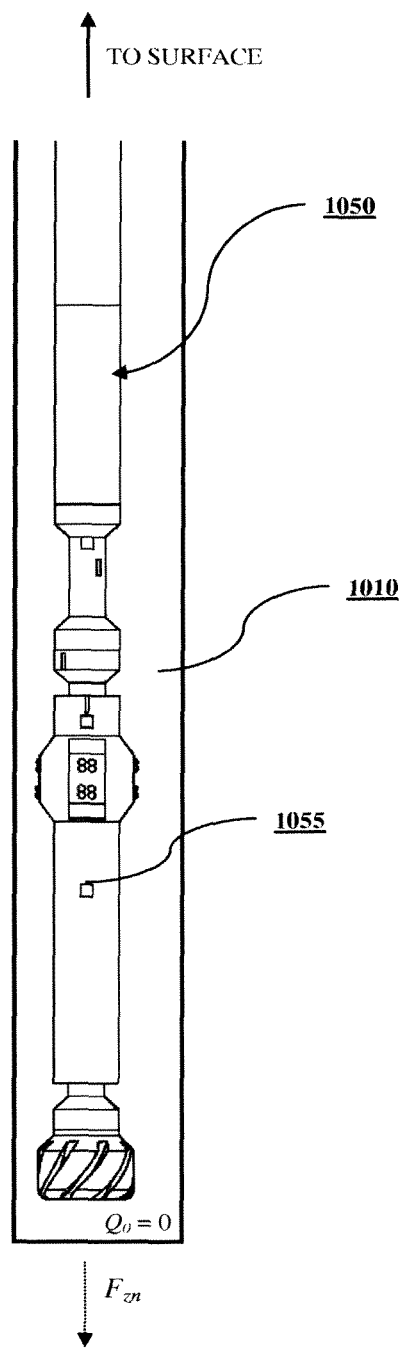
FIGS. 12A-B illustrate submerged bottom hole assemblies according to an embodiment of the invention.

FIG. 12A illustrates an exemplary configuration for making this measurement. FIG. 12A shows BHA 1050 tripped in to a borehole and submerged in mud in annulus 1010. The pumps are turned off, i.e., mud is neither flowing into the drill pipe nor flowing out of the return path of the annulus 1010. Thus, the initial mud flow rate $Q_0$ is 0. WOB sensor 1055 measures an initial no-flow z-axis weight $F_{z0}$.

Optionally, an initial hole inclination $\alpha_0$ can be measured as well, and $F_{z0}$ can be adjusted to account for deviations in measured weight due to hole inclination, such as by the method described above, and as illustrated in FIG. 5A. Subsequent hole inclinations $\alpha_n$ can also be measured and taken into account at each measurement $F_{zn}$ as by the method described above and as illustrated in FIG. 5C, although such measurements are not taken and/or described in this example.

Figure 12B:
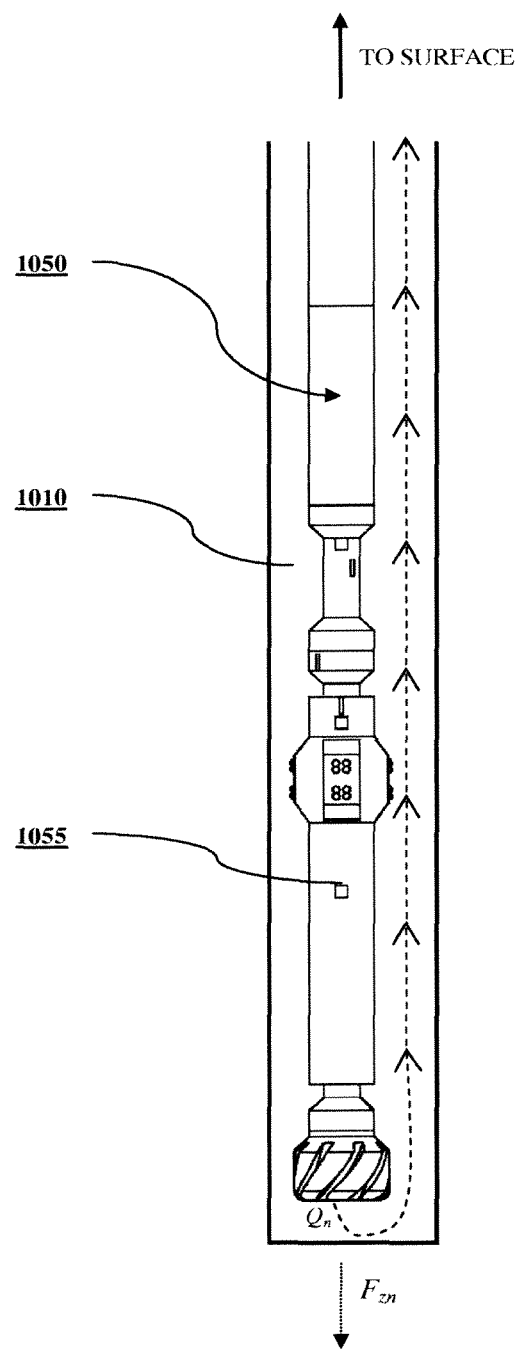

At processing block 930 of FIG. 11, a first sample number n=1 is taken. The pumps are turned on to a first flow rate $Q_1$, and the first sample BHA weight $F_{z1}$ is measured, with the last direction of pipe movement being down. The first sample BHA weight $F_{z1}$ can be measured at any section of the hole, but is measured in this embodiment near vertically in a relatively straight section of the hole where the BHA fits loosely, such as is shown in FIG. 12B.

In this embodiment, the first BHA weight sample measurement $F_{z1}$ is measured at the lowest intended test flow rate $Q_1$, although not required. Increasing flow rate increases differential pressure between the inside of the drill string and the outside of the drill string. Pipe stretch can, in turn, push the drill pipe deeper due to the piston effects of the pressure drop, which is why this test is ideally conducted off-bottom, so that the pipe has room to stretch as the flow and pressure drop is increased. Thus, by measuring $F_{z1}$ at the lowest intended test flow rate, $F_{z2}$ at the next lowest intended test flow rate, etc., the friction coefficient will be maintained during testing as always in tension, or negative, which reduces or eliminates this influence from the WOB sensor measurement. In other words, to observe these benefits at an n-number BHA weight sample measurement, the test flow rates should satisfy the equation $Q_{n+1}>Q_n>Q_{n-1}$.

Using the no-flow BHA weight $F_{z0}$ and the first sample BHA weight $F_{z1}$, the net force due to flow rate $Q_1$, $F_{Q1}$, can be calculated by the following equation:

$$F_{Q1}=F_{z0}-F_{z1} \hspace{3cm} \text{Equation (12)}$$

Preferably, without repositioning the pipe while still being off-bottom with the drill bit, a second sample number n=2 is taken in this embodiment. The fluid flow rate is increased to the next highest flow rate $Q_2$, and the second sample BHA weight $F_{z2}$ is measured at processing block 940. Similarly, the net force due to flow rate $Q_2$, $F_{Q2}$, can be calculated using the no-flow BHA weight $F_{z0}$ and the second-flow BHA weight $F_{z2}$:

$$F_{Q2}=F_{z0}-F_{z2} \quad \text{Equation (13)}$$

Again, preferably without moving the pipe, a third sample number n=3 is taken. The pumps are turned to the highest flow rate $Q_3$, and the third sample BHA weight $F_{z3}$ is measured at processing block 950. The net force due to flow rate $Q_3$, $F_{Q3}$, can be calculated using the no-flow BHA weight $F_{z0}$ and the third sample BHA weight $F_{z3}$:

$$F_{Q3}=F_{z0}-F_{z3} \quad \text{Equation (14)}$$

Although described in this embodiment with respect to three flow rates, any number n≥1 of samples can be used to obtain any number n≥1 of sample BHA weight measurements $F_{zn}$ at flow rates $Q_n$, and in any order, but preferably in increasing flow rate increments. Therefore, the net force due to flow rate $Q_n$, $F_{Qn}$, can be calculated using the following general equation:

$$F_{Qn}=F_{z0}-F_{zn} \quad \text{Equation (15)}$$

FIG. 12B illustrates an exemplary configuration for measuring a number n sample BHA weight $F_{zn}$ at flow rate $Q_n$. FIG. 12B shows BHA 1050 tripped in to a borehole and submerged in mud in annulus 1010. The mud pumps are turned on, i.e., mud is flowing through a feed pipe and downhole through the interior of the drill string and BHA 1050, through orifices in drill bit 1014, and back to the surface via annulus 1010, at a flow rate $Q_n$. WOB sensor 1055 measures n-sample z-axis weight $F_{zn}$. According to Equation (15), the initial no-flow z-axis weight $F_{z0}$ is adjusted by the n-flow z-axis weight $F_{zn}$ to determine the net force $F_{Qn}$ applied to WOB sensor 1055 due to flow rate $Q_n$.

In the case where only one weight sample measurement is taken, $F_{z1}$ can be measured at a mid-range flow rate (such as, for example, flow rate $Q_2$ in the embodiment described above). The model can then be structured using offset data or generalized models from, for example, other wells or calculations. Alternatively, a simple linear model can be obtained using only the data points (0,0) and $(Q_1, F_{z1})$.

In another example where only two weight measurements are taken, $F_{z1}$ and $F_{z2}$ can be measured at a mid-range and high flow rate (such as, for example, flow rates $Q_2$ and $Q_3$ in the embodiment described above). Of course, a higher number n of samples generally results in a greater number of data points, and thus a more accurate curve fit. The number n of samples can be determined for a given application by balancing the need for an accurate curve with the time and expense associated with taking additional measurements. Alternatively, a single flow rate can be measured, and drilling can be done maintaining the flow rate at or near this value throughout the run.

Turning back to FIG. 11, at processing block 960, curve-fit coefficients are determined using the above-calculated net forces, $F_{Qn}$, by plotting their values and fitting a curve to the data points. In typical hydraulic force curves, the force due to pressure across the BHA is a polynomial function that transitions relatively smoothly until turbulent flow is reached. If turbulent flow is encountered, the pressure drop across the BHA below the sensor point can rise dramatically with ever smaller increases in mud flow, and thus is not accurately represented by a simple polynomial equation. It can be appreciated, however, that any type of appropriate curve can be fit to the data points, such as, for example, a logarithmic curve, an exponential curve, etc.

Table 1 shows exemplary sample data measurements of net force $F_{Qn}$ versus flow rate $Q_n$ taken using the method described above.

TABLE 1

| | Sample Data | |
|---|---|---|
| Sample Number n | Mud Flow Rate $Q_n$ (gpm) | Net Force $F_{Qn}$ Due to Flow Rate $Q_n$ (lb$_F$) |
| 0 | 0 | 0 |
| X | 50 | −54 |
| X | 200 | −623 |
| 1 | 400 | −2106 |
| 2 | 500 | −3117 |
| 3 | 600 | −4285 |

Figure 13:
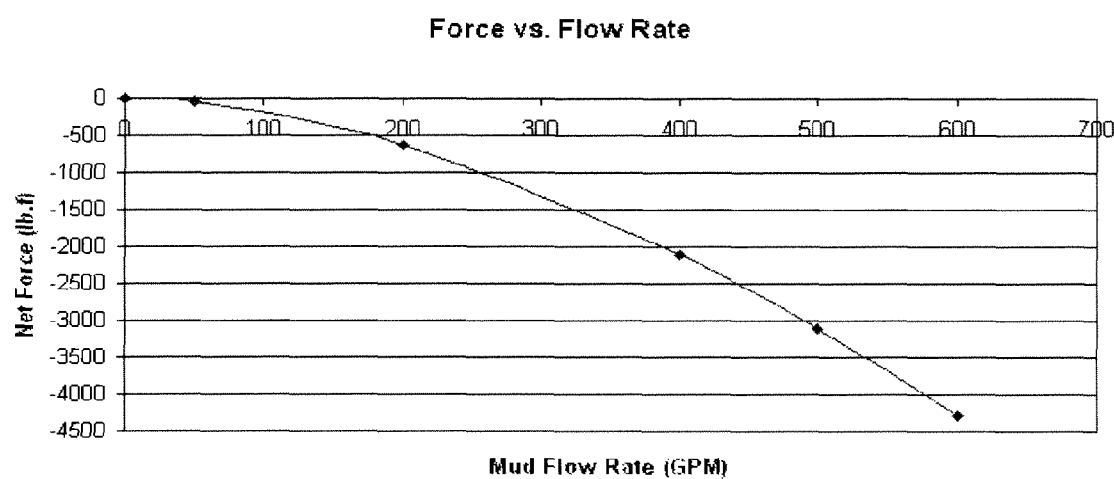
FIG. 13 is a plot of the data of Table 1 illustrating the effects on net force due to flow rate according to an embodiment of the invention.

FIG. 13 is a plot of the data of Table 1 illustrating the effects on net force $F_{Qn}$ due to flow rate $Q_n$. In this example, net force $F_{Qn}$ is negative, as the BHA below the WOB sensor is in tension.

In the case where three samples are taken, a curve fitting equation can be determined that passes through the corresponding three data points as closely as possible. However, for the purpose of the following examples, two samples n=2 and n=3 will be used. Any one or more of a variety of methods can be used to fit the data points corresponding to n=2 and n=3 to a curve. For example, the following model can be used:

$$F_{Qn}=k_1Q_n+k_2Q_n^2 \quad \text{Equation (16)}$$

where $F_{Qn}$ is the net force due to flow rate $Q_n$, $k_1$ is the first order curve-fit coefficient, $Q_n$ is the flow rate at sample number n, and $k_2$ is the second order curve-fit coefficient. Note that in Equation (16), the zero-order curve-fit coefficient $k_0$ is zero. Application of this model in one embodiment is described below in Example 6.

Example 6

Equation (16) has two unknowns, $k_1$ and $k_2$. Thus, a minimum of two samples are needed to converge. Applying flow rates $Q_2$ and $Q_3$ to Equation (16) results in the following system of equations:

$$F_{Q2}=(k_1 \cdot 500)+(k_2 \cdot 500^2) \quad \text{Q2}$$

$$F_{Q3}=(k_1 \cdot 600)+(k_2 \cdot 600^2) \quad \text{Q3}$$

By using rearrangement and substitution, first order curve-fit coefficient $k_1$ can be solved by the following equation:

$$k_1 = \frac{\left[\dfrac{F_{Q3}}{Q_3^2} - \dfrac{F_{Q2}}{Q_2^2}\right]}{\left[\dfrac{1}{Q_3} - \dfrac{1}{Q_2}\right]} \quad \text{Equation (17)}$$

Similarly, second order curve-fit coefficient $k_2$ can be solved by the following equation:

$$k_2 = \frac{\left|\dfrac{F_{Q3}}{Q_3} - \dfrac{F_{Q2}}{Q_2}\right|}{[Q_3 - Q_2]} \quad \text{Equation (18)}$$

Thus, in this example:

$$k_1 = \frac{\left[\frac{-4285}{600^2} - \frac{-3117}{500^2}\right]}{\left[\frac{1}{600} - \frac{1}{500}\right]} = -1.696$$

$$k_2 = \frac{\left[\frac{-4285}{600} - \frac{-3117}{500}\right]}{[600-500]} = -9.077 \cdot 10^{-3}$$

Substituting $k_1$ and $k_2$ into Equation (14), the curve in this example can thus be modeled as:

$$F_{Qn} = -1.696 \cdot Q_n + (-9.077 \cdot 10^3) \cdot Q_n^2$$

Figure 14:
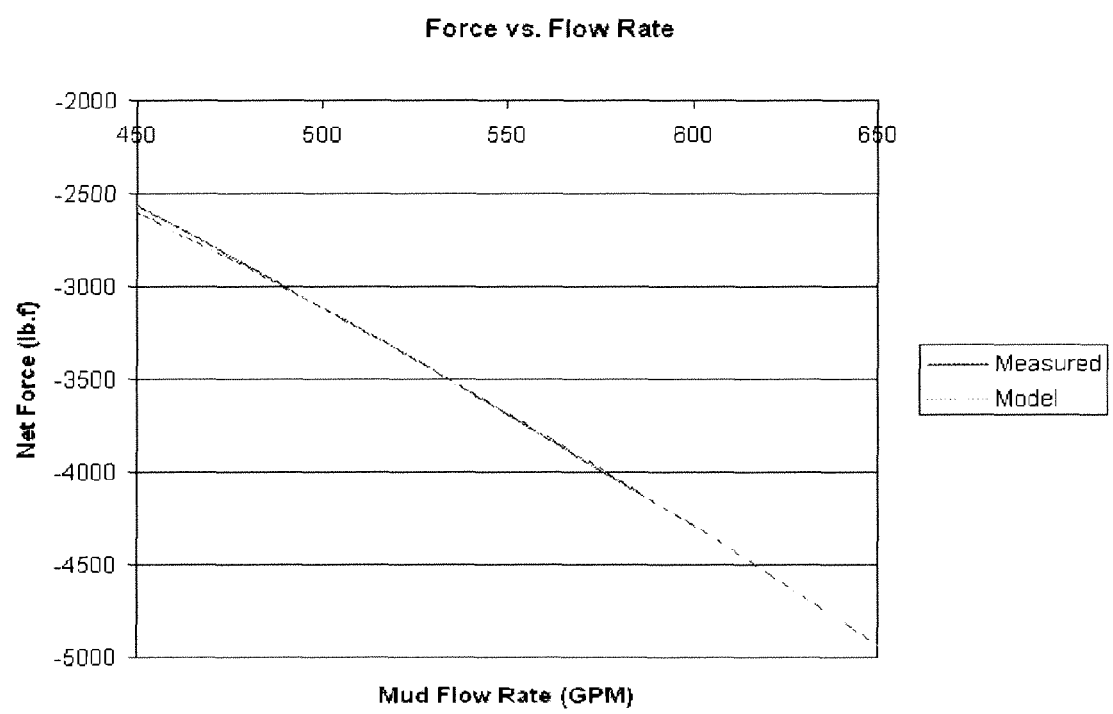
FIG. 14 is a graph of a model curve fit to the data of Table 1 illustrating the effects on net force due to flow rate according to an embodiment of the invention.

FIG. 14 graphs the model curve represented by this equation against the measured data curve of FIG. 13. As shown in FIG. 14, the model curve is a good representation of the behavior of the net force $F_{Qn}$ due to flow rate $Q_n$ in this example. Although modeled by Equation (16) in this embodiment, both less and more sophisticated models and numerical techniques can be applied to make the curve simpler or more accurate. Again, the selection of a particular curve-fitting equation can be made based on the accuracy needed for the particular application.

At processing block 970 of FIG. 11, the pipe is drilled or moved to position number n (reset to n=1 post-sampling), and the weight of the mass below the WOB sensor $F_{zn}$ and flow rate $Q_n$ are measured at processing block 975. At decision block 980, it is determined whether the flow rate $Q_n$ has changed from the previous flow rate measurement $Q_{n-1}$. If the flow rate has changed (i.e., $Q_n$ does not equal $Q_{n-1}$), then the method continues at processing block 985, where the net force $F_{Qn}$ due to flow rate $Q_n$ only is predicted from the model using flow rate $Q_n$. The correction value $CV_n$ is updated with the value of $F_{Qn}$ (or established, in the case where n=1), and the process continues at processing block 990. If the flow rate has not changed (i.e., $Q_n$ equals $Q_{n-1}$), then the correction value $CV_n$ retains its previously value, and the method proceeds directly to processing block 990. In either case, at processing block 990, the measured weight $F_{zn}$ is adjusted on the WOB sensor by the correction value $CV_n$ according to the equation $F_{WOBn} = F_{zn} - CV_n$. Thus, any variances in flow encountered down hole can be accounted for "on the fly" by updating the WOB sensor with the expected $F_{Qn}$ value based on the current flow rate $Q_n$, without stopping to tare the WOB sensor or to measure the net force $F_{Qn}$ caused by the mud flow.

The method proceeds at decision block 995, where it is determined whether drilling is continuing. If drilling continues, position number n is set as n=n+1, and the method loops back to processing block 970. If drilling does not continue, the method concludes with processing block 999, which ends the process.

Pipe Pressure

In an alternative embodiment, pipe pressure can be used instead of mud flow rate to achieve similar results, since flow rate and pipe pressure are interrelated. The above process with respect to pipe pressure would be identical, except that pressure measurements would be taken at specific flow rates, and the measured weight would be corrected based on changes in internal pipe pressure rather than flow rate. Pressure measurements can be taken by a variety of MWD/LWD tools, such as pressure sensors.

As flow paths wash or wear out, however, the pressure versus flow rate relationship can change with a drop in pressure at the same flow rate. Hence, a model using pipe pressure may be retested during long runs to verify that changes in pressure versus mud flow have not diverged significantly enough to affect the desired accuracy.

Further, a pipe pressure model can be broadened to compensate automatically for variance in the pressure versus flow, which can be useful in situations with wear and/or changes in mud properties. For example, additives that are added to a mud system in large concentrations can cause drastic changes to the circulating pressure. These changes in pressure can occur as the additive circulates through the flow path, as mud systems are swapped, or as properties change as drilling proceeds. Increase in pressure can also occur as a result of pipe constriction.

In these instances, the pressure drop across the BHA typically has the greatest impact on the z-axis force applied to the sensor as a result of mud flow. Hence, a higher or lower pressure can be observed for the same flow and thus less or more pipe stretching force. By changing the model to instead respond to changes in pipe pressure near the sensor, however, a more accurate model can be obtained that is more immune to changes in force due to changes in mud properties.

A variety of methods can be employed to determine whether the model should be re-calibrated in this embodiment. For example, the variance in force from the pressure versus the flow rate can be measured. If the variance exceeds what is determined to be a tolerable range, then the model can be re-calibrated.

Combined Gravity and Non-Gravity Effects

One or more of the above-described gravity-dependent forces (i.e., "true" weight of the mass below the WOB sensor at a hole inclination, buoyancy force at a hole inclination, and drag force at a hole inclination) can be combined into a single equation in order to arrive a combined net axial force accounting for hole inclination and non-gravity effects (e.g., mud flow effects) that can be used to calibrate the WOB sensor.

Figure 15:
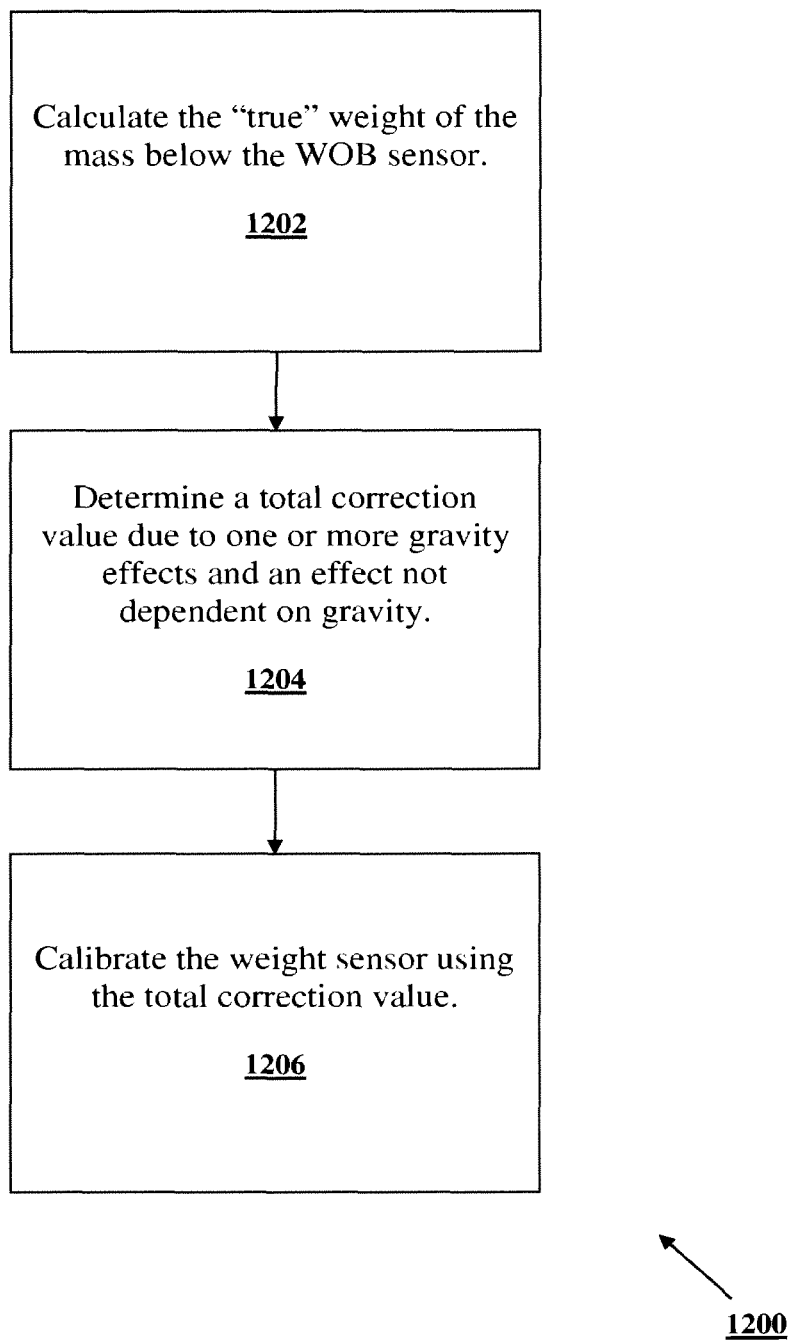
FIG. 15 is a flowchart illustrating a process for automatic WOB measurement calibration using one or more gravity-dependent forces and a force not dependent on gravity according to an embodiment of the invention.

FIG. 15 is a flowchart 1200 illustrating a process for automatic WOB sensor calibration using one or more of the above gravity-dependent forces and non-gravity effects. At 1202, the "true" weight of the mass below the WOB sensor $F_g$ is calculated using one of the above-described methods. At 1204, a total correction value $TCV_n$ due to the combined gravity and non-gravity effects on the WOB sensor measurement is determined by, for example, adding each of their respective correction values together.

For example, to take the effects of mass, buoyancy, drag and mud flow all into account using the mud flow rate, Equation (10) can be updated to further compensate for mud flow as follows:

$$TCV_n = F_s \cdot \cos(\alpha_n) + \mu_{dg} \cdot |F_s| \cdot \sin(\alpha_n) + F_{Qn} \quad \text{Equation (19)}$$

where $TCV_{zn}$ is the combined net axial force at a position number n, $F_s$ is the net free hanging force applied to the BHA when it is submersed in fluid, $\alpha_n$ is the hole inclination at position number n, $\mu_{dg}$ is the dynamic coefficient of friction between the bore wall and the BHA, and $F_{Qn}$ is the net force due to flow (i.e., the mud flow correction value).

Similarly, to take the effects of mass, buoyancy, drag and mud flow all into account using the pipe pressure, Equation (10) can be updated to further compensate for mud flow as follows:

$$TCV_n = F_s \cdot \cos(\alpha_n) + \mu_{dg} \cdot |F_s| \cdot \sin(\alpha_n) + F_{Pn} \quad \text{Equation (20)}$$

where $TCV_n$ is the combined net axial force at a position number n, $F_s$ is the net free hanging force applied to the BHA when it is submersed in fluid, $\alpha_n$ is the hole inclination at position number n, $\mu_{dg}$ is the dynamic coefficient of friction between the bore wall and the BHA, and $F_{Pn}$ is the force applied to the WOB sensor due to measured pressure (i.e., the pipe pressure correction value).

At 1206, the weight sensor is calibrated using the total correction value $TCV_n$, which reflects the offset of the WOB sensor measurement due to the combined effects of the selected forces on the WOB sensor. Although each of the forces herein are described with detail, it is understood that the effects of one or more of these forces may be negligible under particular conditions or in particular applications. Thus, it is contemplated that a more accurate model of the true WOB may be obtained without measuring, calculating and/or otherwise considering the effects of one or more of the above forces.

Figure 16:
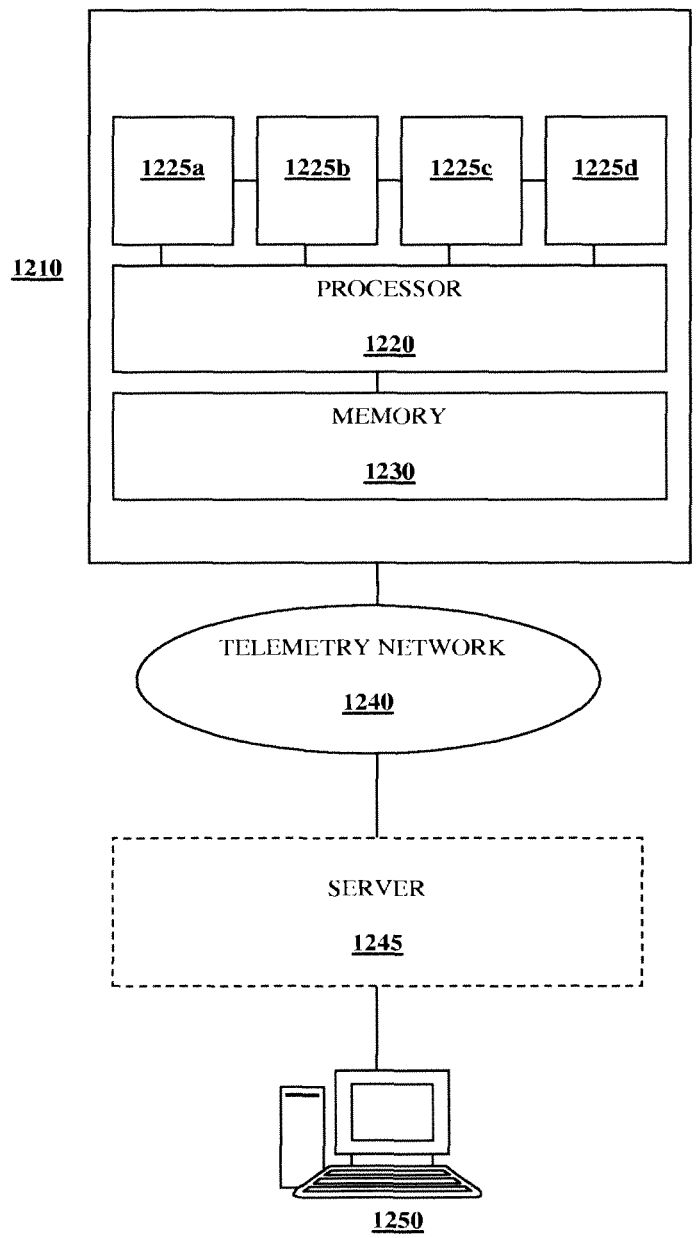
FIG. 16 is a schematic diagram illustrating a system of an embodiment for effecting the methods described herein.

FIG. 16 illustrates a system of an embodiment for effecting the methods described above. BHA electronics unit 1210 transmits and receives data via telemetry network 1240 to a server 1245, or transmits and receives data directly to and from at least one surface system 1250. BHA electronics unit 1210 comprises a plurality of measurement tools 1225*a-d*, including WOB sensor 1225*a*, as well as processor 1220 and memory 1230, each of which are in communication with one another. BHA electronics unit 1210 is typically a computer system. Memory 1230 may be any type of volatile or non-volatile storage media that includes, for example, read-only memory (ROM), random access memory (RAM), magnetic disk storage media, optical storage media, flash memory devices, and zip drives.

Telemetry network 1240 may be any network for transmitting and receiving data to and/or from BHA electronics unit 1210, such as a mud pulse telemetry network, an electromagnetic telemetry network, a wired pipe network, a pipe-in-pipe network, an acoustic telemetry network, a torsion telemetry network, or combinations thereof, and for transmitting and receiving data to and/or from server 1245. In simplex networks, such as is used in many mud pulse telemetry systems, data is transmitted from downhole to surface in one direction only. By adding a downlink feature with a surface transmitted and a receiver in the BHA, a full duplex mode of transmission can be used that is bi-directional. Duplex networks, such as high data rate wired pipe or pipe-in-pipe networks, provide for two-way rapid communication that can be utilized to perform a variety of functions deemed impractical for slower systems, such as EM or mud pulse telemetry systems.

Surface system 1250 may comprise analog or digital interfaces, displays, mainframes, minicomputers, personal computers, laptops, personal digital assistants (PDAs), cell phones, netbooks, thin clients, and other computing devices. Telemetry network 1240 and surface system 1250 are characterized in that they are capable of being connected to server 1245.

Server 1245 decodes data received from BHA electronics unit 1210, if necessary, and transmits the decoded data to at least one surface system 1250. In an embodiment of the invention using a wired pipe network as telemetry network 1240, server 1245 is not necessarily required, and data can be transmitted directly to and from telemetry network 1240 and surface system 1250. In this embodiment, surface system 1250 can convert the electrical data signal received from telemetry network 1240 into decodable computer-readable signals.

In embodiments where server 1245 is used, server 1245 can be directly wired, wirelessly connected, or a combination thereof, to BHA electronics unit 1210. In one embodiment, server 1245 acts as a surface receiver for surface system 1250 using, for example, antennas, acoustic receivers, pipe-in-pipe electrical connections, etc., and can convert the electrical data signal received from telemetry network 1240 into decodable computer-readable signals.

Server 1245 is typically a computer system, and may be an HTTP (Hypertext Transfer Protocol) server, such as an Apache server, to an FTP server. Server 1245 can communicate with surface system 1250 using, for example, direct wiring, a local area network (LAN), wide area network (WAN), a telephone network, such as the Public Switched Telephone Network (PSTN), an intranet, the Internet, or combinations thereof.

In one embodiment using a duplex network, a downlink command to retrieve content is communicated to one or more of measurement tools 1225*a-d* and memory 1230 by processor 1240. For example, a signal is transmitted from processor 1220, the signal having a destination address (e.g., an address representing WOB sensor 1225*a*), a request (e.g., a WOB sensor measurement), and a return address (e.g., an address representing processor 1220). In response, another signal may be transmitted that includes a destination address corresponding to the return address of processor 1220 and the content responsive to the request. Processor 1220 retrieves a plurality of content by this method, including, for example, a WOB sensor measurement from WOB sensor 1225*a*, a hole inclination measurement from NBI sensor 1225*b*, etc.

In use, to account for mass effects on WOB sensor 1225*a*, such as illustrated in FIG. 6, for example, the BHA is tripped in a short distance. In a duplex network, processor 1220 receives a request for an initial off-bottom z-axis weight of the BHA below the WOB sensor, $F_{z0}$, and an initial hole inclination $\alpha_0$. Thus, processor 1220 requests a measurement from WOB sensor 1225*a* and NBI sensor 1225*b*, receives the measurements, and optionally determines whether $\alpha_0=0$. If $\alpha_0=0$, processor 1220 establishes a variable $CV_0$, sets its value to the initial weight $F_{z0}$, and stores it in memory 1230. If $\alpha_0 \neq 0$, processor 1220 calculates the "true" weight of the mass below the WOB sensor $F_g$ according to Equation (1), establishes the variable $CV_0$ set to the "true" weight $F_g$, and stores it in memory 1230. Meanwhile, processor 1220 stores the measurements in memory 1230, and a count number n is set as 1.

The pipe is then drilled or moved to a new depth. Processor 1220 receives another request for a current z-axis weight measurement of the BHA below the WOB sensor, $F_{z1}$, and a current hole inclination $\alpha_1$. Thus, processor 1220 requests another measurement from WOB sensor 1225*a* and NBI sensor 1225*b*, receives the measurements, and requests initial hole inclination $\alpha_0$ from memory 1230. Processor 1220 compares current hole inclination $\alpha_1$ to initial hole inclination $\alpha_0$ to determine whether hole inclination has changed. If $\alpha_1 \neq \alpha_0$ (i.e., the hole inclination has changed), correction value $CV_1$ is set according to the equation $CV_1=F_g \cdot \cos(\alpha_1)$, as described above, and stored in memory 1230. If $\alpha_1=\alpha_0$ (i.e., the hole inclination has not changed), correction value $CV_1$ is set and stored as $CV_1=CV_0$. Processor 1220 then establishes the "true" WOB, $F_{WOB1}=F_{z1}-CV_1$, and transmits $F_{WOB1}$ to surface system 1250. Surface system 1250 may be or may include a WOB interface, which displays $F_{WOB1}$. If the pipe is drilled or moved, processor 1220 receives another request to measure WOB, n is set as n=2, and the method is performed again. If the pipe is no longer drilled or moved, the method ends.

In another embodiment using a simplex network, processor 1220 retrieves a plurality of content from measurement tools 1225*a-d* at preprogrammed intervals, according to instructions stored in memory 1230. In that case, processor 1220 requests a measurement from WOB sensor 1225a for an initial off-bottom z-axis weight of the BHA below the WOB sensor, $F_{z0}$, and requests a measurement from NBI sensor 1225b for an initial hole inclination $\alpha_0$. Processor 1220 receives the measurements, and optionally determines whether $\alpha_0=0$. If $\alpha_0=0$, processor 1220 establishes a variable $CV_0$ sets its value to the initial weight $F_{z0}$, and stores it in memory 1230. If $\alpha_0 \neq 0$, processor 1220 calculates the "true" weight of the mass below the WOB sensor $F_g$ according to Equation (1), establishes the variable $CV_0$ set to the "true" weight $F_g$, and stores it in memory 1230. Meanwhile, processor 1220 stores the measurements in memory 1230, and a count number n is set as 1. Measured values near 0 for $\alpha_0$ can be assumed as 0 if the measured value is below an acceptable threshold which would not impact the calculation in any substantial manner for the purpose of the correction being calculated.

The pipe is then drilled or moved. At the next preprogrammed interval, processor 1220 requests a current z-axis weight measurement of the BHA below the WOB sensor, $F_{z1}$, from WOB sensor 1225a, and a current hole inclination $\alpha_1$ from NBI sensor 1225b. Processor 1220 receives the measurements, and requests initial hole inclination $\alpha_0$ from memory 1230. Processor 1220 compares current hole inclination $\alpha_1$ to initial hole inclination $\alpha_0$ to determine whether hole inclination has changed. If $\alpha_1 \neq \alpha_0$ (i.e., the hole inclination has changed), correction value $CV_1$ is set according to the equation $CV_1 = F_g \cdot \cos(\alpha_1)$, as described above, and stored in memory 1230. If $\alpha_1 = \alpha_0$ (i.e., the hole inclination has not changed), correction value $CV_1$ is set and stored as $CV_1 = CV_0$. Processor 1220 then establishes the "true" WOB, $F_{WOB1} = F_{z1} - CV_1$, and transmits $F_{WOB1}$ to surface system 1250. Again, threshold ranges can be used for determining whether a new calculation is required. If drilling continues, processor 1220 requests another current WOB and current hole inclination at the next preprogrammed interval, n is set as n=2, and the method is performed again. If the pipe is no longer drilled or moved, the method ends.

Although described with respect to the method illustrated in FIG. 6, it is understood that any of the methods described herein can be similarly performed. Further, although described with particular devices, it is understood that a variety of similar devices may be employed to perform the processes described herein. The functions of these and other embodiments can be described as modules of computer executable instructions recorded on tangible media. The modules can be segregated in various manners over various devices.

Figure 17:
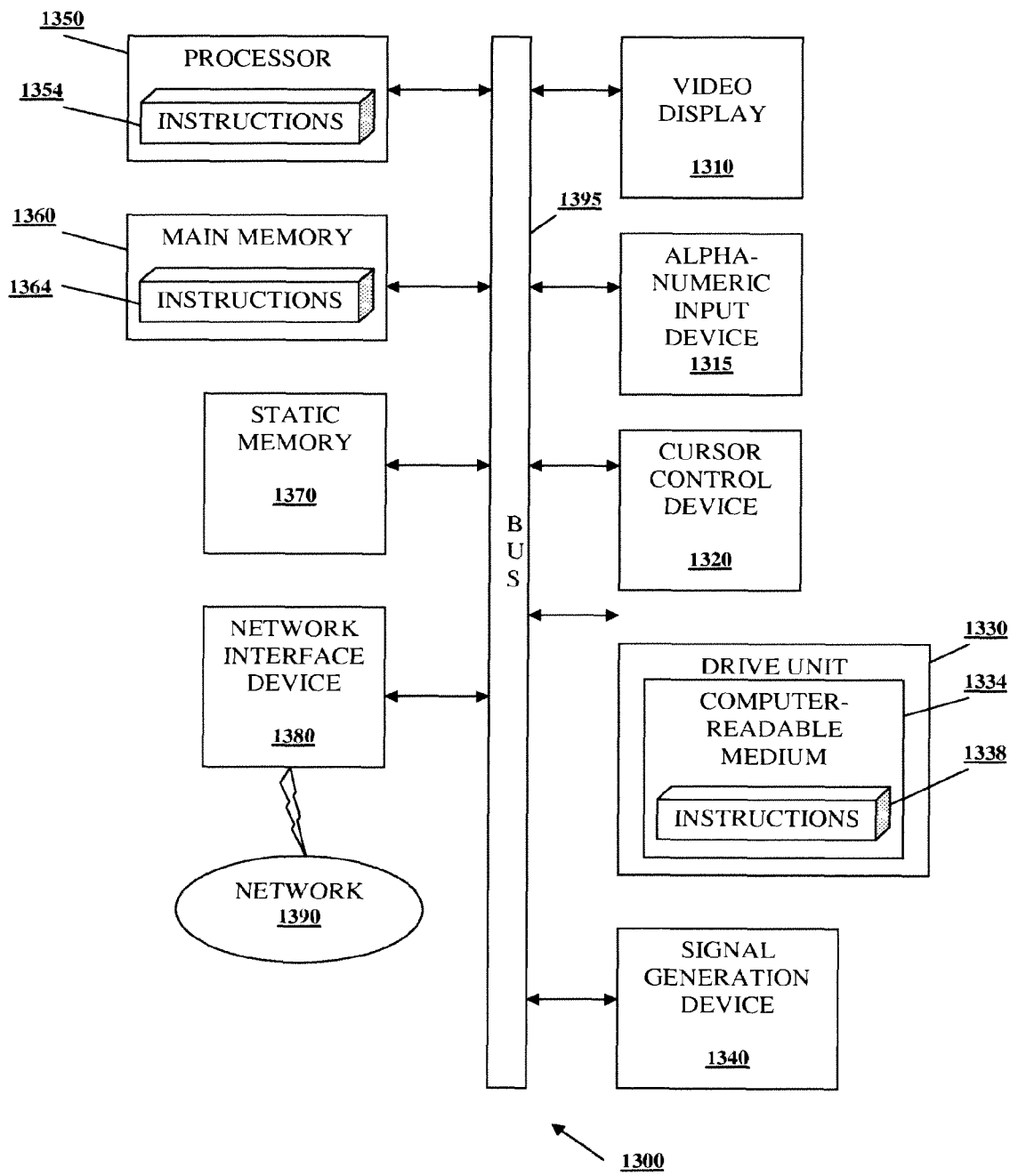
FIG. 17 is diagrammatic representation of a machine having a set of instructions for causing the machine to perform any of the one or more methodologies discussed herein.

FIG. 17 shows a diagrammatic representation of a machine in the exemplary form of computer system 1300 within which a set of instructions, for causing the machine to perform any of the one or more methodologies discussed herein, may be executed. In alternative embodiments, the machine operates as a standalone device or may be connected (e.g., networked) to other machines. In a networked deployment, the machine may operate in the capacity of, for example, a server or a client machine in server-client network environment, or as a peer machine in a peer-to-peer (or distributed) network environment. The machine may be, for example, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

According to some embodiments, computer system 1300 comprises processor 1350 (e.g., a central processing unit (CPU), a graphics processing unit (GPU) or both), main memory 1360 (e.g., read only memory (ROM), flash memory, dynamic random access memory (DRAM) such as synchronous DRAM (SDRAM) or Rambus DRAM (RDRAM), etc.) and/or static memory 1370 (e.g., flash memory, static random access memory (SRAM), etc.), which communicate with each other via bus 1395.

According to some embodiments, computer system 1300 may further comprise video display unit 1310 (e.g., a liquid crystal display (LCD) or a cathode ray tube (CRT)). According to some embodiments, computer system 1300 also may comprise alphanumeric input device 1315 (e.g., a keyboard), cursor control device 1320 (e.g., a mouse), disk drive unit 1330, signal generation device 840 (e.g., a speaker), and/or network interface device 1380.

Disk drive unit 1330 includes computer-readable medium 1334 on which is stored one or more sets of instructions (e.g., software 1338) embodying any one or more of the methodologies or functions described herein. Software 1338 may also reside, completely or at least partially, within main memory 1360 and/or within processor 1350 during execution thereof by computer system 1300, main memory 1360 and processor 1350 also constituting computer-readable media. Software 1338 may further be transmitted or received over network 1390 via network interface device 1380.

While computer-readable medium 1334 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the methods described herein. Those skilled in the art will appreciate that many different combinations of hardware, software, and firmware will be suitable for practicing the present invention.

The present invention has been described in relation to particular examples, which are intended in all respects to be illustrative rather than restrictive. Further, while the present invention has been described in connection with a number of exemplary embodiments, and implementations, the present inventions are not so limited, but rather cover various modifications, and equivalent arrangements.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method for optimizing weight measurements in drilling operations, the method comprising:
    calculating a net axial force applied to a weight sensor on a downhole tool using a hole inclination and a weight of the downhole tool;
    determining a correction value with the net axial force; and
    calibrating the weight sensor with the correction value.

2. The method of claim 1, wherein the correction value is determined using at least one of a subsequent hole inclination, a buoyancy force, a drag force, a mud flow force, and a pipe pressure.

3. The method of claim 2, wherein the buoyancy force is calculated using at least one of a mud density and a density of the mass below the weight sensor.

4. The method of claim 2, wherein the drag force is calculated using a dynamic coefficient of friction.

5. The method of claim 2, wherein the mud flow force accounts for at least one of piston effects and a fluid friction force.

6. The method of claim 1, wherein calibrating comprises calculating a corrected weight on bit using the correction value and a weight measurement measured by the weight sensor.

7. The method of claim 6, further comprising: displaying the corrected weight on bit.

8. The method of claim 6, further comprising: adjusting a bottom hole assembly using the corrected weight on bit.

9. A system for optimizing weight measurements in drilling operations, the system comprising:
    a downhole tool including a weight sensor configured to measure a weight;
    a processor coupled to the weight sensor that:
        calculates a net axial force applied to the weight sensor using a hole inclination and the weight of the downhole tool,
        determines a correction value using the net axial force, and
        calibrates the weight sensor using the correction value; and
    a memory coupled to the processor.

10. The system of claim 9, wherein the processor determines the correction value using at least one of a subsequent hole inclination, a buoyancy force, a drag force, a mud flow force, and a pipe pressure.

11. The system of claim 10, wherein the buoyancy force is calculated with at least one of a mud density and a density of the mass below the weight sensor.

12. The system of claim 10, wherein the drag force is calculated with a dynamic coefficient of friction.

13. The method of claim 10, wherein the mud flow force accounts for at least one of piston effects and a fluid friction force.

14. The system of claim 9, wherein the processor further calculates a corrected weight on bit using the correction value and a weight measurement measured by the weight sensor.

15. The system of claim 14, further comprising: a display that displays the corrected weight on bit.

16. The system of claim 15, wherein the display is a weight on bit interface.

17. The system of claim 14, further comprising: a controller that adjusts a bottom hole assembly using the corrected weight on bit.

18. The system of claim 9, wherein the weight sensor is a weight-on-bit sensor.

19. The system of claim 9, wherein the weight sensor is integrated into at least one of a measurement-while-drilling (MWD) assembly and a logging-while-drilling (LWD) assembly.

* * * * *